US009557160B2

(12) United States Patent
Kang et al.

(10) Patent No.: US 9,557,160 B2
(45) Date of Patent: Jan. 31, 2017

(54) MOBILE TERMINAL HAVING SMART MEASURING TAPE AND LENGTH MEASURING METHOD THEREOF

(71) Applicant: LG ELECTRONICS INC., Seoul (KR)

(72) Inventors: Haksoo Kang, Seoul (KR); Jonghen Han, Seoul (KR); Kwontaeg Choi, Seoul (KR); Youngbin Yim, Seoul (KR); Yunghee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/821,114

(22) Filed: Aug. 7, 2015

(65) Prior Publication Data
US 2016/0040981 A1 Feb. 11, 2016

(30) Foreign Application Priority Data

Aug. 7, 2014 (KR) .................. 10-2014-0101813

(51) Int. Cl.
H04M 3/42 (2006.01)
G01B 11/02 (2006.01)
G01S 17/08 (2006.01)
H04M 1/725 (2006.01)
G01S 17/02 (2006.01)
G01S 7/00 (2006.01)
G01S 7/48 (2006.01)
G01S 7/51 (2006.01)

(52) U.S. Cl.
CPC .......... *G01B 11/022* (2013.01); *G01B 11/026* (2013.01); *G01S 7/003* (2013.01); *G01S 7/4808* (2013.01); *G01S 7/51* (2013.01); *G01S 17/023* (2013.01); *G01S 17/08* (2013.01); *H04M 1/72522* (2013.01); *G01S 17/026* (2013.01); *H04M 2250/12* (2013.01)

(58) Field of Classification Search
CPC ...... H04W 88/021; G01C 3/08; G01C 15/002; G01S 17/74
USPC ....... 455/556.1, 41.2; 382/106, 190; 33/277; 348/135; 700/259; 715/765, 244
See application file for complete search history.

(56) References Cited

U.S. PATENT DOCUMENTS

| 7,643,833 B2* | 1/2010 | Sankisa | H04W 88/021 455/41.2 |
| 2005/0210380 A1* | 9/2005 | Kramer | G06F 3/04845 715/244 |
| 2006/0137194 A1* | 6/2006 | Tyroler | G01C 15/002 33/277 |
| 2007/0030348 A1* | 2/2007 | Snyder | G01C 3/08 348/135 |

(Continued)

*Primary Examiner* — Lester Kincaid
*Assistant Examiner* — Gary Lafontant
(74) *Attorney, Agent, or Firm* — Birch, Stewart, Kolasch & Birch, LLP

(57) ABSTRACT

A method for measuring a length in a mobile terminal, and which includes selecting a virtual measuring tape function on the mobile terminal for measuring a size of an object; setting, via a controller of the mobile terminal, a reference object; setting, via the controller, a spaced distance of the reference object with respect to the mobile terminal to be zero when the reference object is brought into contact with the mobile terminal; measuring, via a laser of the mobile terminal, the spaced distance of the reference object with respect to the mobile terminal as the reference object is moved away from the mobile terminal; and outputting the measured spaced distance.

19 Claims, 29 Drawing Sheets

(56) References Cited

U.S. PATENT DOCUMENTS

| | | | |
|---|---|---|---|
| 2008/0215184 A1* | 9/2008 | Choi | G06K 9/3241 |
| | | | 700/259 |
| 2010/0166263 A1* | 7/2010 | Cao | G01C 5/00 |
| | | | 382/106 |
| 2011/0066399 A1 | 3/2011 | Mahajan | |
| 2013/0136363 A1* | 5/2013 | Na | G06F 17/30047 |
| | | | 382/190 |
| 2013/0227452 A1* | 8/2013 | Kang | G06F 3/0488 |
| | | | 715/765 |
| 2013/0260824 A1* | 10/2013 | Chen | G01S 17/74 |
| | | | 455/556.1 |

\* cited by examiner

FIG. 19
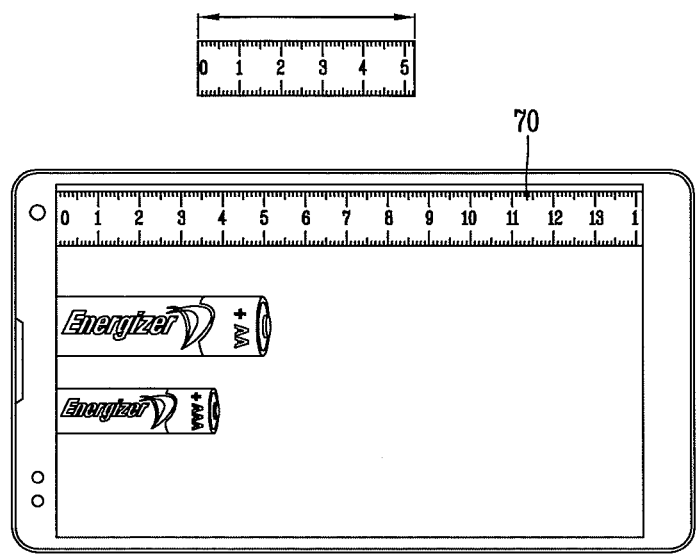
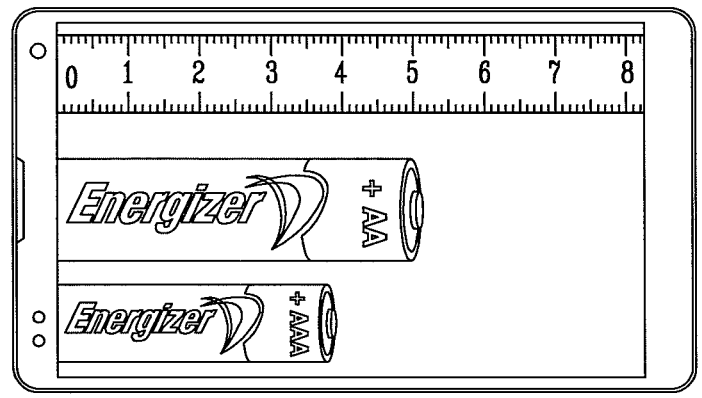
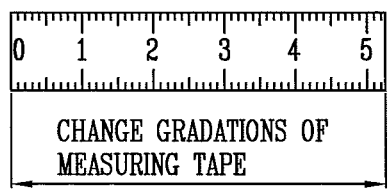

FIG. 23
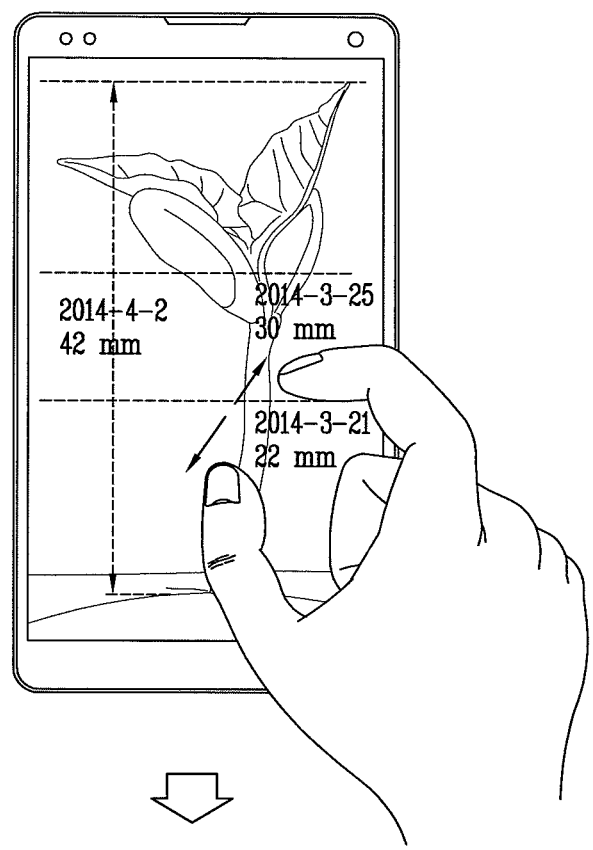
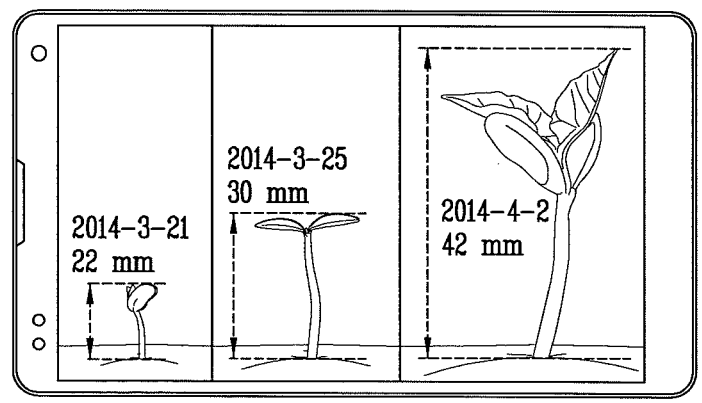

MOBILE TERMINAL HAVING SMART MEASURING TAPE AND LENGTH MEASURING METHOD THEREOF

CROSS-REFERENCE TO RELATED APPLICATION

Pursuant to 35 U.S.C. §119(a), this application claims the benefit of earlier filing date and right of priority to Korean Application No. 10-2014-0101813, filed on Aug. 7, 2014, the contents of which is incorporated by reference herein in its entirety.

BACKGROUND OF THE DISCLOSURE

1. Field of the Disclosure

This specification relates to a mobile terminal having a smart measuring tape, capable of measuring a length of a subject, which is captured or has been captured through a camera, and a length measuring method thereof.

2. Background of the Disclosure

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs. As it becomes multifunctional, a mobile terminal can capture still images or moving images, play music or video files, play games, receive broadcast and the like, so as to be implemented as an integrated multimedia player.

In general, an auto focus (AF) function is used upon capturing a subject using a camera. The distance is measured from the camera to the subject upon carrying out the AF function. The distance measurement up to the subject may be performed according to a method using infrared rays or supersonic waves or a through-the-lens (TTL) method.

The method of measuring the distance using the supersonic waves calculates the distance by measuring a time which is taken for supersonic wave emitted from a supersonic generator of the mobile terminal to come back to the mobile terminal by being reflected from an object (or subject). Further, the method of measuring the distance using infrared rays calculates the distance by measuring a strength or a time of infrared ray which comes back by being reflected from an object.

Further, the TTL method brings a camera lens into focus on an object by analyzing an image obtained through a CCD/CMOS image sensor, and calculates the distance up to the object based on a position of a lens in the focus-on state. However, the method using the infrared rays or ultrasonic waves has a limit of the distance that the infrared ray or the ultrasonic wave can reach, so as to cause a difficulty in measuring the distance up to a subject located at a far distance. Also, in this method, an accurate adjustment of focus on an object which is very close to a camera lens is hardly executed due to parallax.

Further, the TTL method can adjust the focus even on an object located at a far distance or an object very close to the camera lens, without any trouble. However, the CCD/CMOS image sensor cannot accurately detect contrast (details) of an object, such as an object (a blue sky, a monochromic wall, etc.) with a low contrast ratio, an object located at a place with less light, an object with high reflectivity, and the like, which results in a difficulty of distance measurement.

Therefore, a mobile terminal which measures the distance according to the related art method using the infrared rays or ultrasonic waves and the TTL method cannot measure an accurate distance, and thereby fails to perform an accurate AF function using those methods. Also, in the related art, the distance measurement technology is merely applied to a limited function, such as the auto focus, but fails to provide various functions and user interfaces (UIs) in association with a capturing scene of a camera or an object online.

SUMMARY OF THE DISCLOSURE

Therefore, an aspect of the detailed description is to provide a mobile terminal having a smart measuring tape, capable of measuring a length of a subject by applying a distance measurement technology using a laser to a capturing scene, and a length measuring method thereof.

Another aspect of the detailed description is to provide a mobile terminal having a smart measuring tape, capable of showing a real length (real length) of a subject which is captured or has been captured through a camera, and a length measuring method thereof.

Another aspect of the detailed description is to provide a mobile terminal having a smart measuring tape, capable of facilitating for measuring and checking a length of a real object (subject) or an object image using a virtual measuring tape (or a virtual ruler), and a method of measuring an object length thereof.

To achieve these and other advantages and in accordance with the purpose of this specification, as embodied and broadly described herein, there is provided a method for measuring a length in a mobile terminal, the method including selecting a virtual measuring tape function, setting a reference object, measuring a length of a subject based on a spaced distance of the reference object, the spaced distance measured by a laser when the reference brought into contact with the mobile terminal and one end of the subject is spaced apart therefrom, and outputting a final length of the subject when the reference object reaches another end of the subject.

To achieve these and other advantages and in accordance with the purpose of this specification, as embodied and broadly described herein, there is provided a mobile terminal including a display unit configured to output a virtual measuring tape, a memory configured to store a virtual measuring tape function and a setting of a reference object, and a controller configured to measure a length of a subject based on a spaced distance of the reference object, the spaced distance measured by a laser when the reference brought into contact with the mobile terminal and one end of the subject is spaced apart therefrom, and output a final length of the subject when the reference object reaches another end of the subject.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 19 is a view illustrating one example of outputting a real size of a subject according to a spaced distance of the subject;

FIGS. 22 and 23 are views illustrating an embodiment of a method for outputting an image of a continuously-captured subject;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
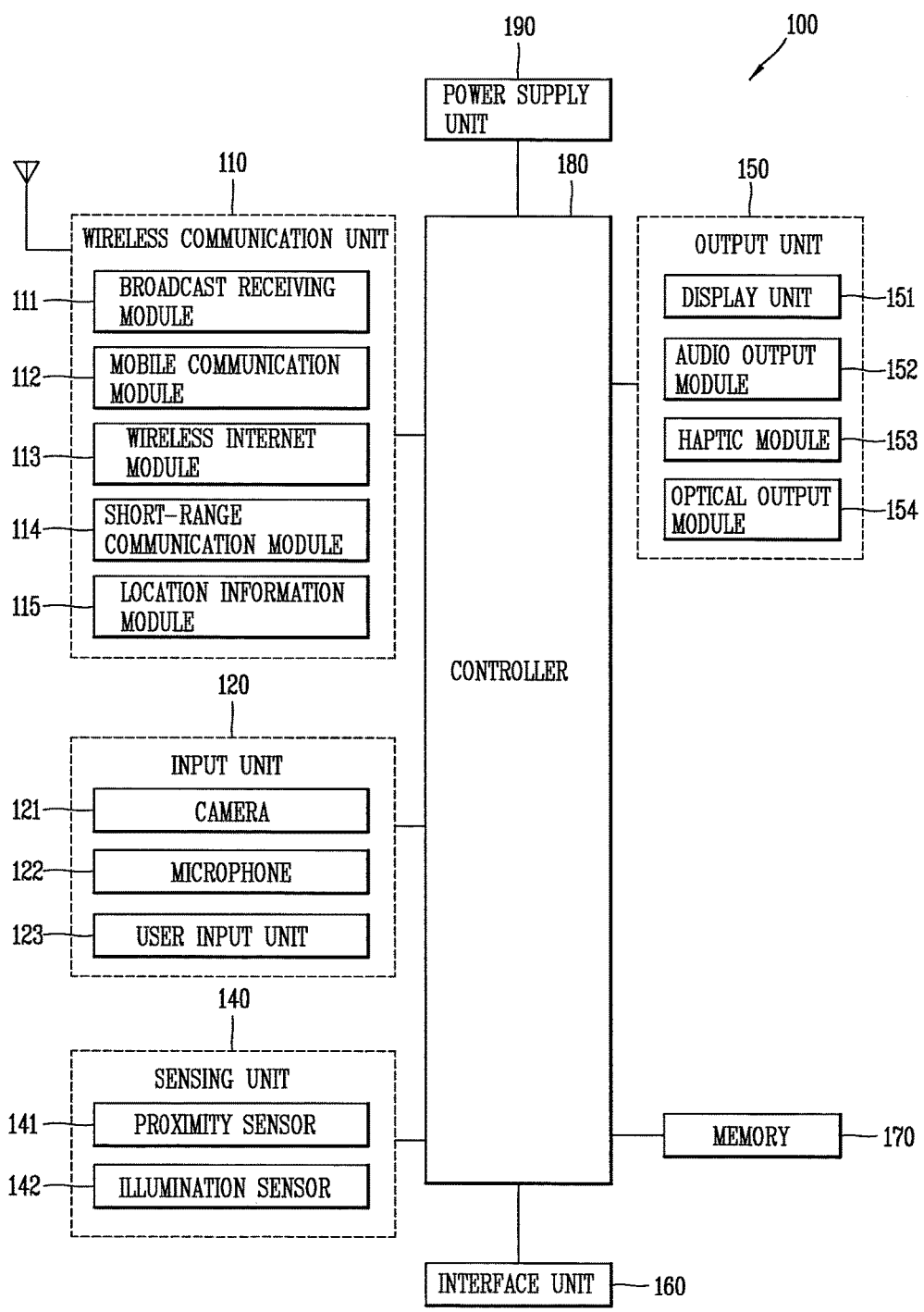
FIG. 1 is a block diagram of a mobile terminal according to one embodiment of the present invention.
Figure 2A:
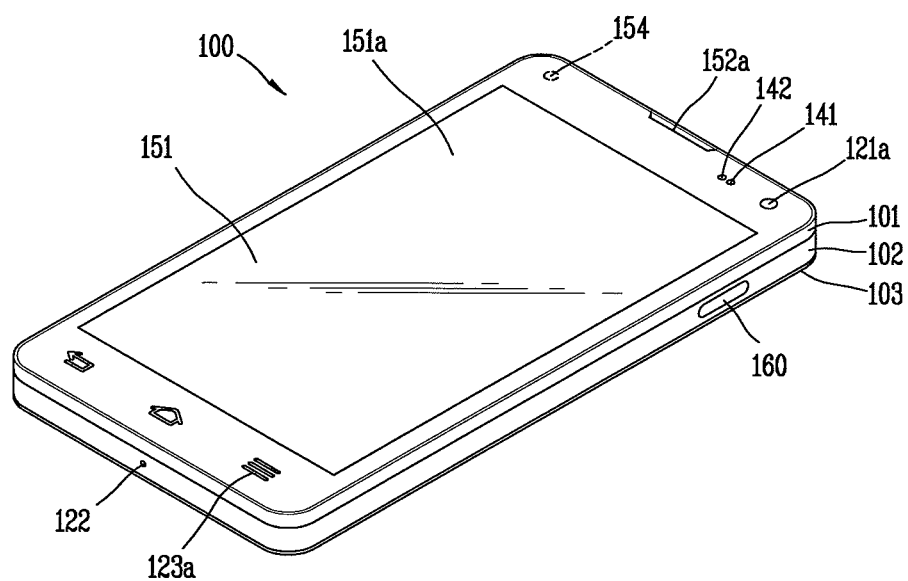
FIGS. 2A and 2B are conceptual views illustrating one example of the mobile terminal, viewed from different directions.
Figure 2B:
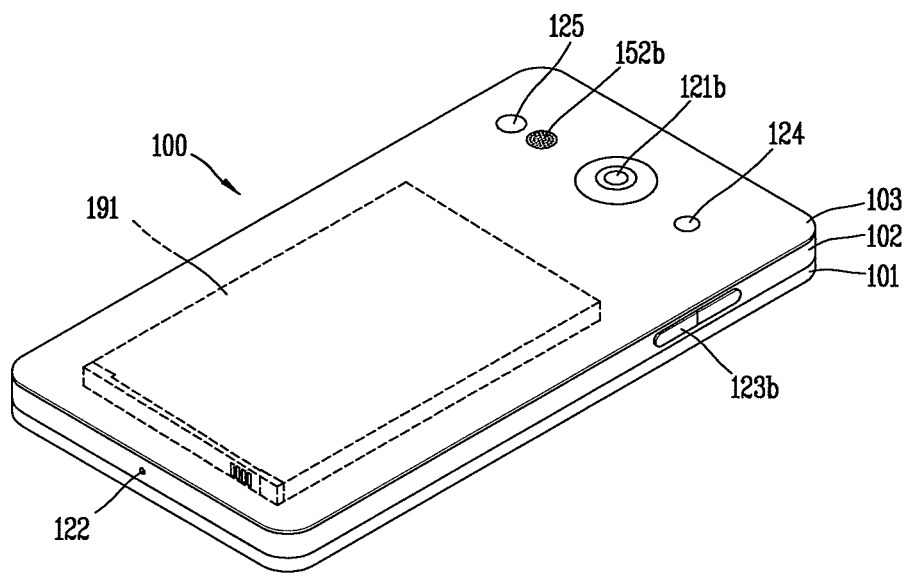

FIG. 1 is a block diagram of a mobile terminal in accordance with one exemplary embodiment of the present invention;, and FIGS. 2A and 2B are conceptual views illustrating one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190 Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, an ultrasonic type and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121 a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151 a and the front case 101). In this instance, a hole independently formed to output audio sounds may not be seen or is otherwise hidden in terms of appearance, thereby further simplifying the appearance and manufacturing of the mobile terminal 100.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2A illustrates the first manipulation unit 123a as a touch key, but possible alternatives include a push (or mechanical) key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, description will be given of a communication system operable with a mobile terminal according to the present disclosure. First, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS) (specifically, the Long Term Evolution (LTE) and LTE-advanced (LTE-A), the Global System for Mobile Communications (GSM), and the like.

By way of non-limiting example only, further description will relate to a CDMA communication system, but such teachings apply equally to other system types including an Orthogonal Frequency Division Multiplexing (OFDM) wireless communication system as well as the CDMA wireless communication system. A CDMA wireless communication system is shown having a plurality of mobile terminals, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1) is typically configured inside the mobile terminal 100 to receive broadcast signals transmitted by the BT.

In addition, the CDMA wireless communication system may be linked to a Global Positioning system (GPS) for checking a position of the mobile terminal 100. Such satellites 300 facilitate locating the position of the mobile terminal 100. Two satellites are depicted but useful position information may be obtained with greater or fewer satellites than two satellites. Here, the positioning of the mobile terminal 100 may be performed by using every positioning technology as well as the GPS positioning technology. Also, at least one of the GPS satellites may alternatively or additionally be configured to provide satellite DMB transmissions.

Hereinafter, description will be given of exemplary embodiments associated with a control method which can be implemented in the mobile terminal having such configuration, with reference to the accompanying drawings. It will be obvious to those skilled in the art that the present disclosure can be specified into other particular forms without departing from the spirit and essential characteristics of the present disclosure.

The present invention uses a laser detection auto focus (LDAF) function. The LDAF function refers to a technology of adjusting the focus on a subject (or object) very fast rather than the related art, by recognizing a spaced distance of the subject through an optical (laser) sensor. The present invention can measure the distance between a mobile terminal (or camera) and a reference object through the distance measurement technology using a laser (LDAF laser) mounted at a rear surface of the terminal, and provide various associated functions using the measured spaced distance.

The reference object corresponds to an end portion of a measuring tape. A structure that the reference object moves along a subject refers to that an end of a measuring tape is unrolled on the subject length of which is to be measured. The reference object is an object (target) which is used for distance measurement, and also includes a digital device (e.g., a wearable device) as well as an object (thing), a person, and a specific portion (e.g., a hand) of a person, which are brought into focus. The reference object includes a complex object including text or image as well as an individual object.

The associated function may be a magnifying glass function which is provided in association with a capturing scene of a camera. This function is applied when a user moves a mobile terminal up and down above a subject, and associated with a preview screen of the camera. The association function may be a normal measuring tape function which is provided in association with a capturing scene of a camera. This function is to output a ruler (or a measuring tape) for measuring a real size of a subject on a preview screen of the camera or a captured subject. This function may be applied to a subject in a small size or a subject in a simple shape.

The association function may be a virtual measuring tape function for measuring a real size of a subject. This function is to measure a real length (or size) of the subject using a separate reference object. This function may generally be applied to a subject in a great size. The association function may be a virtual measuring tape function for checking (or measuring) a real length of an image (e.g., product) displayed online. This function is to measure a size of a subject displayed online using a separate reference object.

To perform such operations, the mobile terminal according to an embodiment of the present invention includes an LDAF laser having a laser generating portion and a laser receiving portion. The distance between the mobile terminal and a subject in the present invention is used as the same meaning as the distance between the camera and the subject.

Hereinafter, the preferred embodiments of the present invention will be described. In particular, FIG. 3 is a flowchart illustrating the distance measuring method of a mobile terminal using an LDAF technology applied to the present invention.

Figure 3:
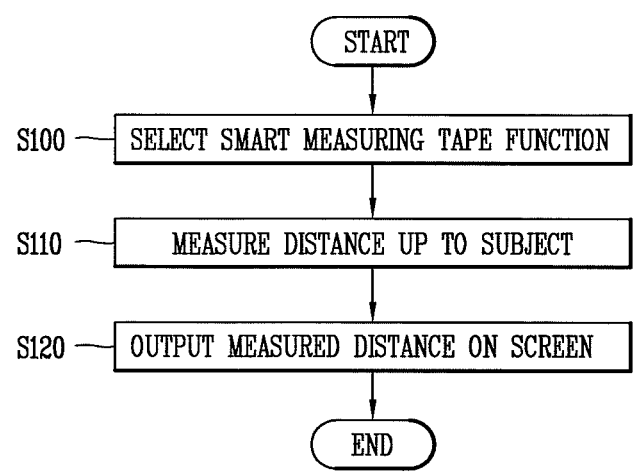
FIG. 3 is a flowchart illustrating a distance measuring method of a mobile terminal using an LDAF technology applied to the present invention.

As illustrated in FIG. 3, after a user turns on a camera function and orients the camera to face a subject (or an object), an image of the subject is output on a preview screen. Under this state, when a smart measuring tape function is selected (S100), the controller 180 activates the laser generating portion within the LDAF laser to emit laser light toward the subject. When a laser signal reflected by the subject is received in the laser receiving portion, the controller 180 calculates the distance between the camera and the subject based on a time of the reflected laser signal, and outputs the calculated distance on one side of the preview screen (S110, S120).

Figure 4:
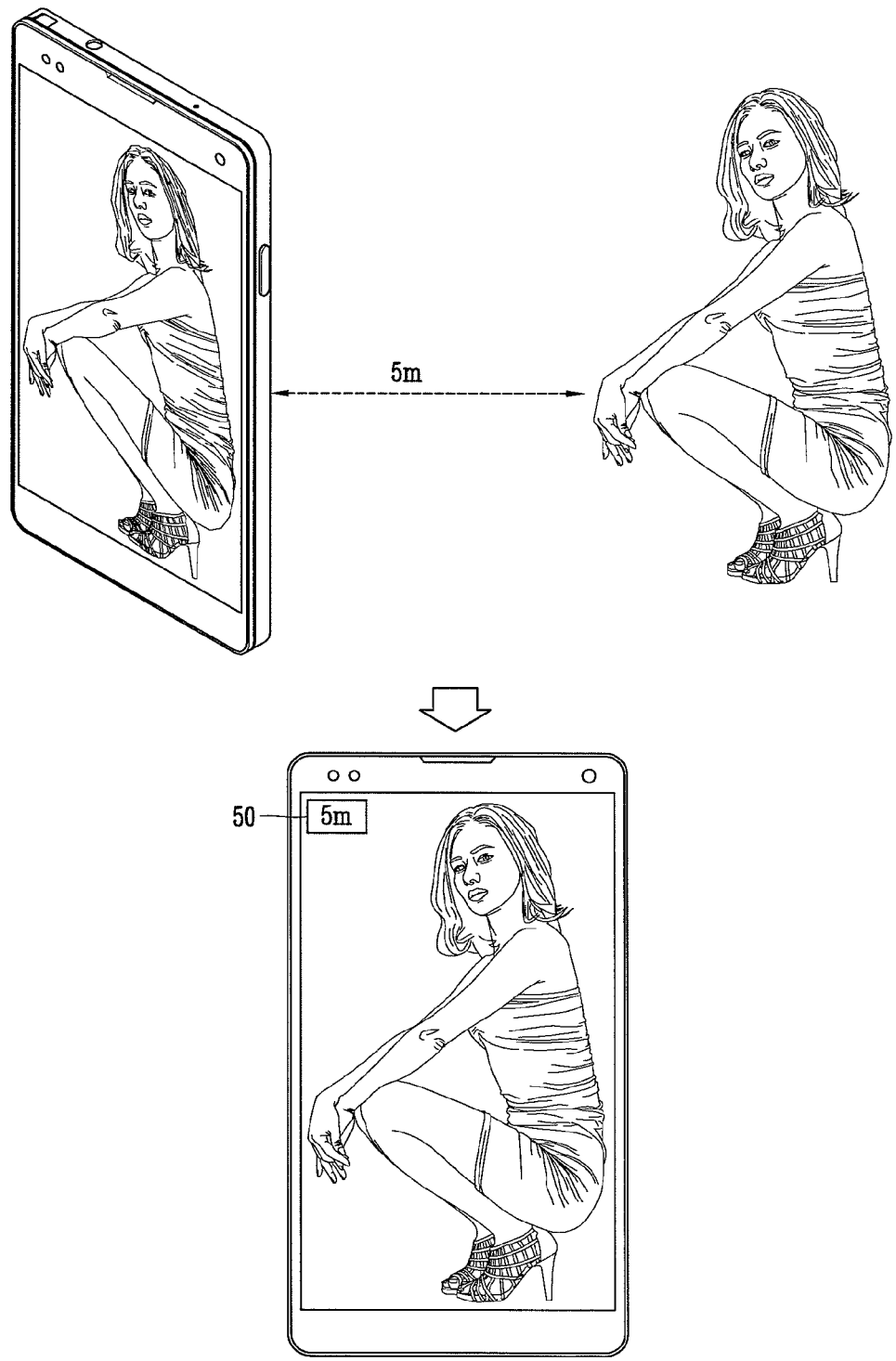
FIG. 4 is a view illustrating an embodiment of measuring the distance between a mobile terminal and a subject to be captured using an LDAF technology.

FIG. 4 is a view illustrating an embodiment of measuring the distance between a mobile terminal and a subject to be captured using an LDAF technology. As illustrated in FIG. 4, when the user selects the camera function (menu) and orients the camera to face a front subject (i.e., a person), a preview screen is output. When a smart measuring tape menu (or function) is selected on the preview screen, the controller 180 automatically brings the camera into focus on the subject by measuring the distance between the mobile terminal (or the camera) and the subject (i.e., the person) according to the aforementioned method, and outputs a measured distance 50 on a left upper portion of the preview screen. The measured distance 50 may also be output on a right upper portion, a left or right lower portion, or other portions.

When it is difficult for the user to bring the camera into focus on the subject due to a far distance from the subject or to capture the subject due to a screen composition, the user can capture a specific object by holding it up and set the captured object to the distance measurement target, or if an interoperable wearable device is present, may set the corresponding device to the measurement target.

Figure 5:
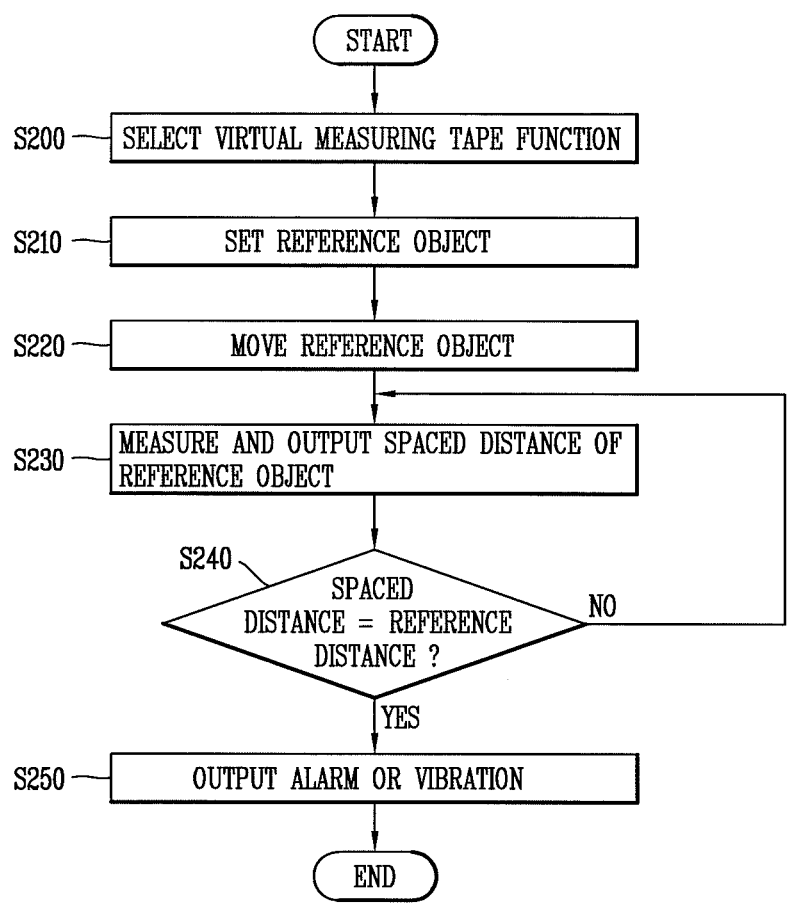
FIG. 5 is a flowchart illustrating the distance measuring method using a smart measuring tape in accordance with an embodiment of the present invention.
Figure 6:
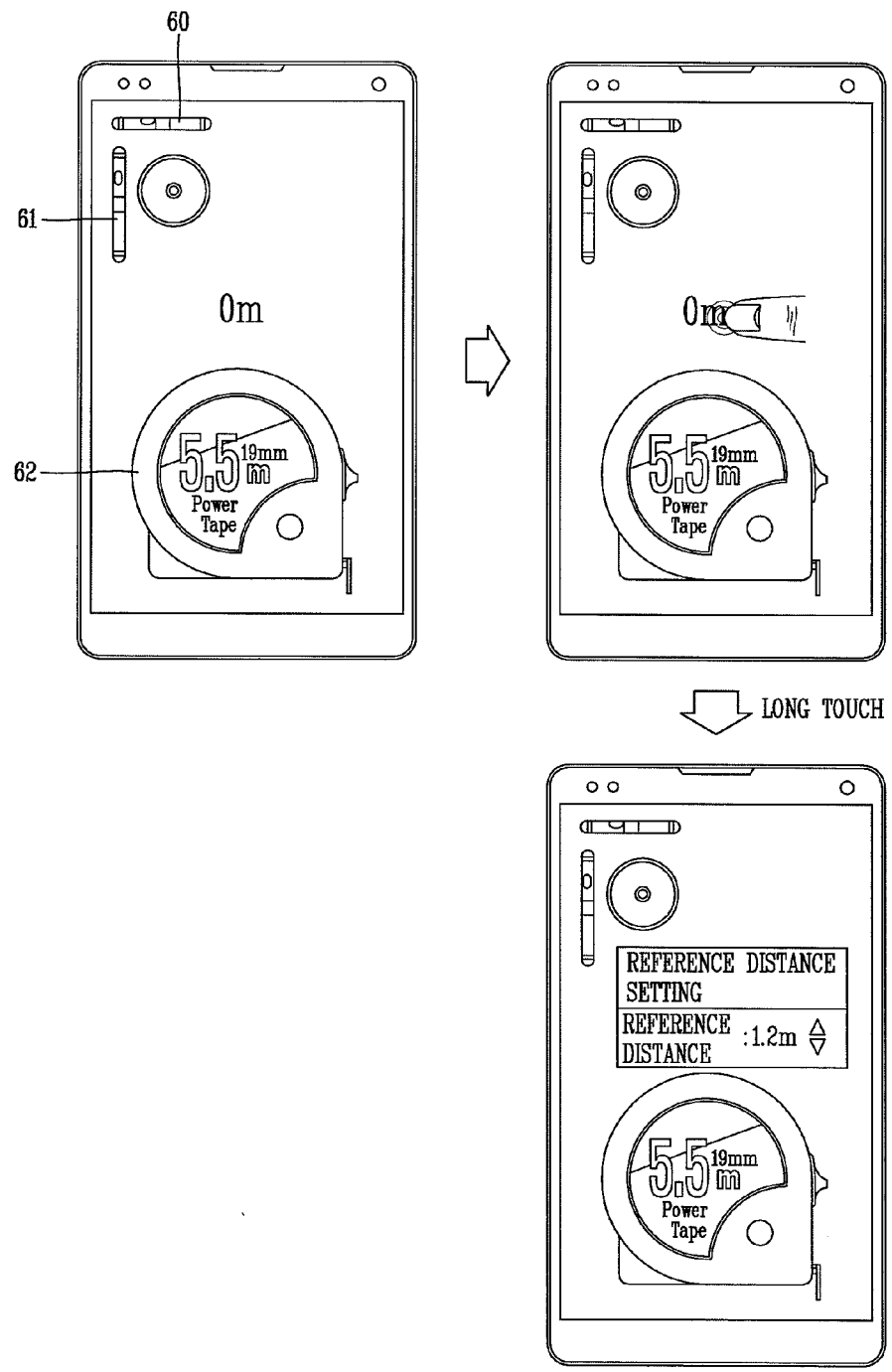
FIGS. 6 and 7 are views illustrating a detailed embodiment of the distance measurement using the smart measuring tape.

Next, FIG. 5 is a flowchart illustrating the distance measuring method using a smart measuring tape in accordance with an embodiment of the present invention, and FIG. 6 illustrates an embodiment of an initial screen of the distance measurement using the smart measuring tape.

As illustrated in FIG. 5, a user can select a virtual measuring tape menu from a smart measuring tape menu (S200), and also select a reference object to be used for measuring a length of a subject (or an object) in the virtual measuring tape menu (S210). The present invention illustrates an example in which a hand has been selected as the reference object for the sake of brief explanation.

When the hand is set to the reference object, the controller 180, as illustrated in FIG. 6, outputs indicators 60 and 61 for checking horizontal and vertical states of the mobile terminal on one side of a screen of the mobile terminal, and also outputs a measuring tape image 62 on another side thereof With no limit to this, the controller 180 can also output a reference object on an initial screen.

When a user applies a long touch to the measuring tape image 62 or maintains a touch applied to the measuring tape image 62 for a predetermined time, the controller 180 activates an LDAF function to be ready for measuring the distance. In another embodiment, the LDAF function can be activated by selection of a menu.

When the LDAF function is activated, the user adjusts the horizontal and vertical states of the mobile terminal while viewing the indicators 60 and 61, and then a popup window is output for setting a reference distance by applying a long touch to an initial measurement distance (0 m). The user can set a reference distance (e.g., 1.2 m) of a subject to be measured on the popup window. The reference distance, which is a movable distance of the reference object (e.g., the hand), may be set in the form of centimeters (cm) and meters (m), inches (in), feet (ft.), yards, etc.

Figure 7:
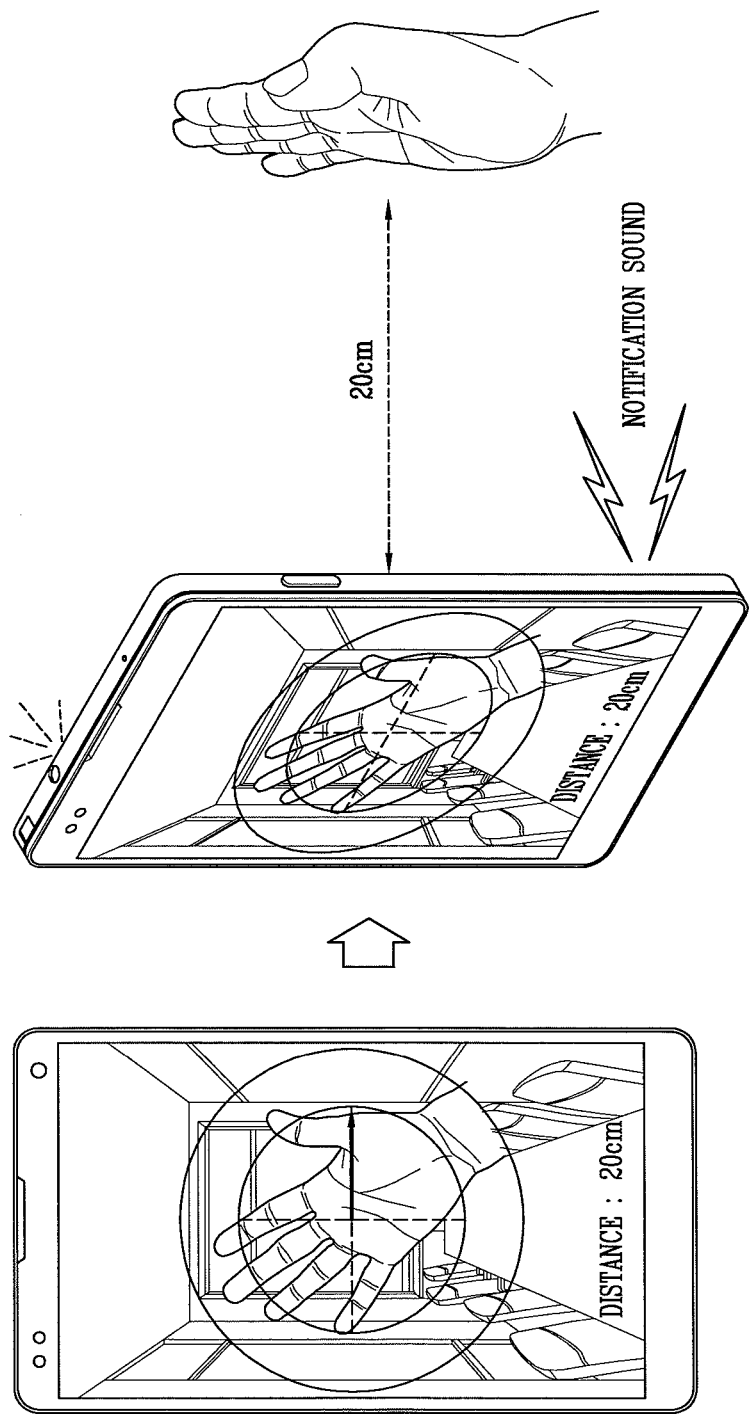

FIG. 7 is a conceptual view illustrating a measurement of the distance using a smart measuring tape. As illustrated in FIG. 7, the user horizontally moves their hand (a reference object), which is closely adhered on a rear surface of the mobile terminal, away from the mobile terminal (S220). The controller 180 controls a laser 125 (see FIG. 2B) mounted at the rear surface to emit a laser signal to the hand so as to sense a reflected laser signal through the LDAF sensor. Accordingly, the controller 180 measures the distance between the mobile terminal and the hand and outputs the measured distance on the screen (S230). The hand can be the hand of the user or a hand of another person (e.g., a friend, etc.).

The present invention, however, is not limited to this. The user can also simultaneously situate the mobile terminal and the hand at one end of an object and thereafter move the terminal, other than the hand, in one of upper, lower, left and right directions to face the hand. Here, the user can set the hand to be flush with the LDAF sensor such that the LDAF sensor can accurately detect a laser signal.

If the hand is not recognized, the controller 180 can generate a warning sound and vibration. In another embodiment, the controller 180 can output a guide (line) on a screen such that the hand can be moved along the guide line (when two people measure the distance) or output different sounds. For example, as illustrated in FIG. 7, the controller 180 can output an arrow on a cross-shaped line to guide the hand such that the hand can be located exactly at a central point.

When the hand which is in the closely-adhered state on the rear surface of the terminal is moved away from the terminal, the controller 180 can generate a sound that the measuring tape is unrolled through the audio output module 152 and also control the laser generating portion to emit laser light to the hand, so as to measure the distance (spaced distance) between the mobile terminal and the hand. The controller 180 then recognizes the measured distance as a length of a target object. Afterwards, when the hand reaches another end of the target object and is maintained there for a predetermined time, the controller 180 outputs the measured distance (an unrolled length of the measuring tape) as a length of the target object around a measuring tape image 62 (S230).

Therefore, after placing the mobile terminal at one side of a desired object length of which is actually to be measured, the user can move their hand to another side of the object to measure the distance between the terminal and their hand, thereby measuring the length of the desired object.

One embodiment of the present invention can also generate an alarm or vibration when the distance between the terminal and the hand is the same as or proximate to a reference distance which has been set and stored by the user. The reference length is a length of the target object. For example, when measuring a length of a predetermined object (or subject) using a terminal and a hand, the controller 180 can compare a measured distance between the terminal and the hand with a prestored reference distance (S240), and generate an alarm or vibration when the two distances are equal to each other (S250). As another example, when the distance between the terminal and the hand gets close to a predetermined length set and stored by the user, the controller 180 can differently output an alarm or vibration in different strength according to the close distance.

Figure 8:
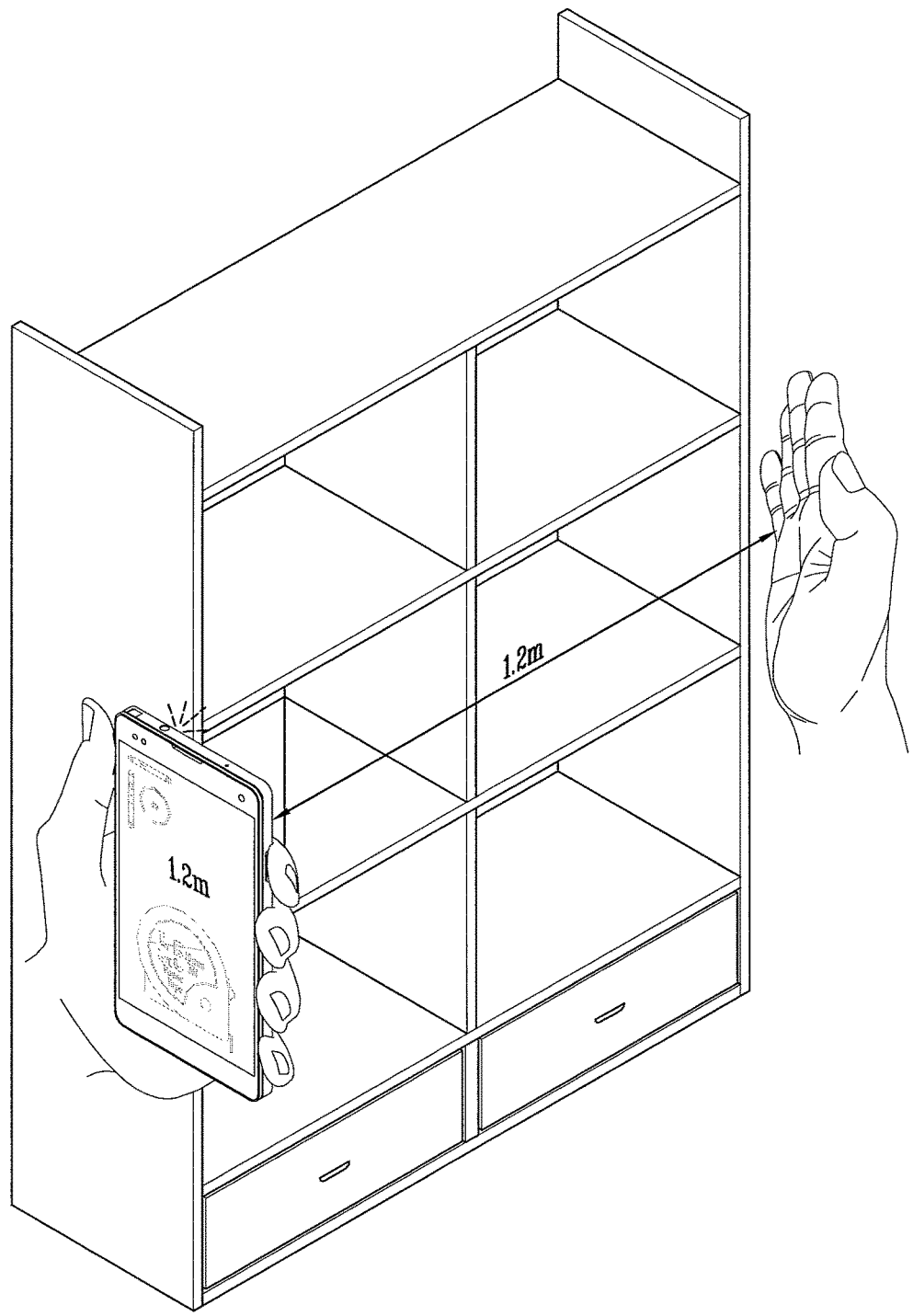
FIGS. 8 and 9 are views illustrating one embodiment of a length measuring method using a smart measuring tape in accordance with an embodiment of the present invention.
Figure 9:
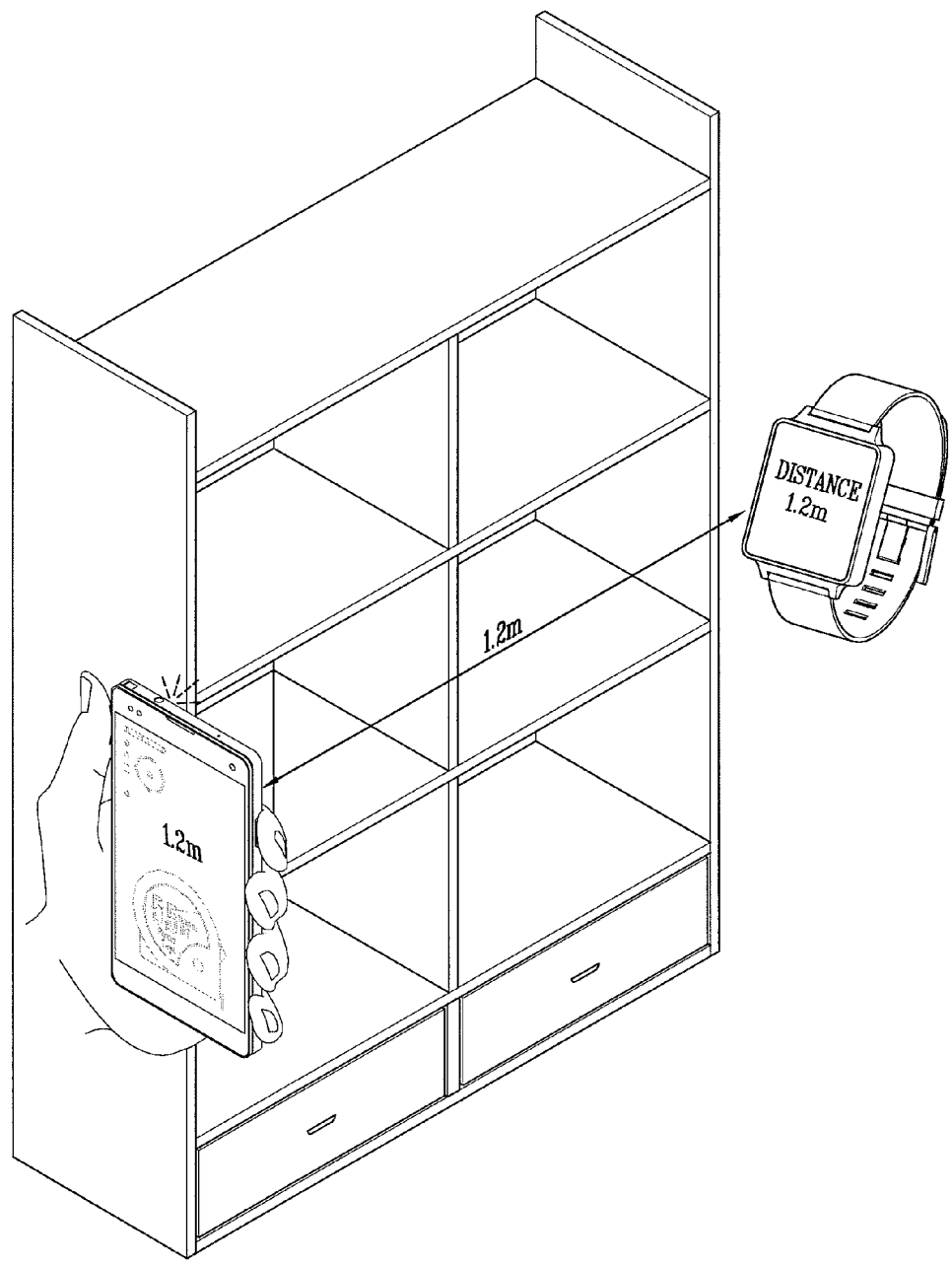

Next, FIGS. 8 and 9 are views illustrating one embodiment of a length measuring method using a smart measuring tape in accordance with an embodiment of the present invention. As illustrated in FIG. 8, after the terminal and a reference object (e.g., a hand) are aligned at a left side of a bookshelf, when the hand is horizontally moved to the right, the controller 180 measures the distance between the terminal and the hand by emitting laser light toward the hand. When the hand is stopped at the right end, the controller 180 recognizes the measured spaced distance of the hand as a horizontal size (length) of the bookshelf, and outputs the recognized length on a screen of the mobile terminal. The hand may be a hand of a user or another person who is currently measuring the length.

Also, when the user has set a reference distance (1.2 m) that the reference object (e.g., the hand) has to move, the controller 180 generates an alarm or vibration when the measured length of the bookshelf is 1.2 m. The measured horizontal length of the bookshelf is stored in the memory 170. The vertical length of the bookshelf may also be measured by the same method. In addition to the hand, a flat object, for example, a coin may also be selected as the reference object.

The reference object may be replaced with a wearable device, such as a smart watch or a smart band. The wearable device and the mobile terminal can be paired to each other. When the reference object is a smart watch, as illustrated in FIG. 9, the controller 180 of the mobile terminal 100 can transmit the measured horizontal size of the bookshelf to the paired smart watch, such that the measured length of the bookshelf and an alarm/vibration can also be output on the smart watch. Also, when the reference object is a wearable device, length information and notification sound can be output on the wearable device even in operations of FIGS. 11 to 15B to be explained later.

Figure 10A:
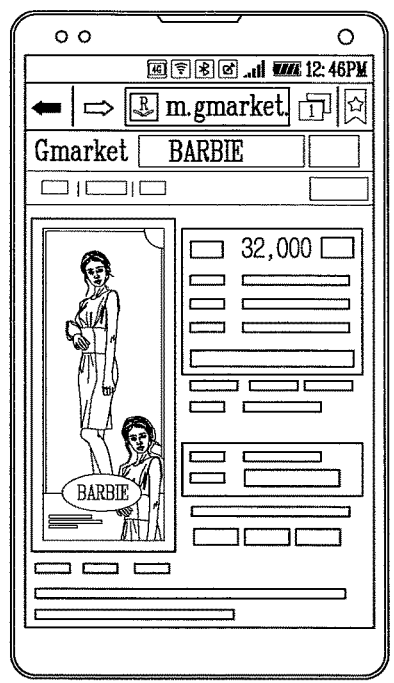
FIGS. 10A and 10B are views illustrating one example of a product image output online.
Figure 10B:
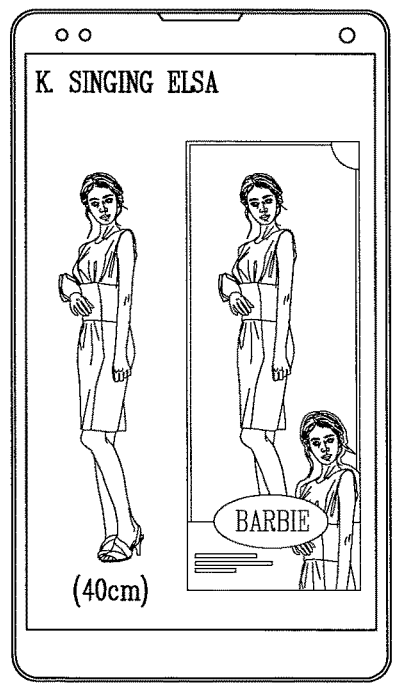

Next, FIGS. 10A and 10B are views illustrating one example of a product image which is output online. As illustrated in FIGS. 10A and 10B, images of various products may be output on a webpage (e.g., a shopping mall) accessed by the user. Size (length) information related to each product is provided on a description of the product. However, it is difficult for the user to check a real size of the product and whether or not the product can be placed in his or her cabinet, merely based on the size (length) information.

Figure 11:
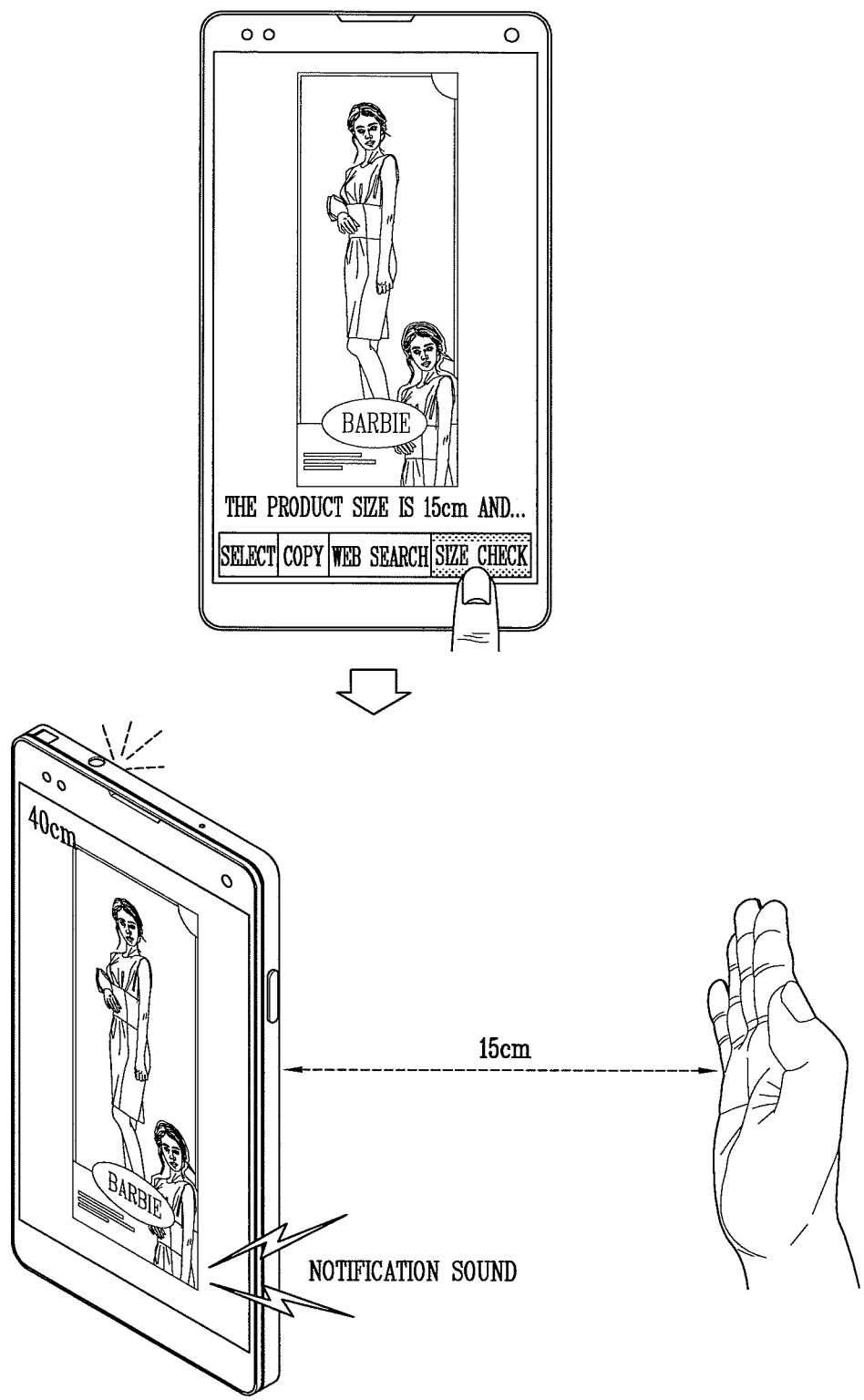
FIG. 11 is a view illustrating one example of a length measuring method using a smart measuring tape in accordance with an embodiment of the present invention.

FIG. 11 is a view illustrating one example of a length measuring method using a smart measuring tape in accordance with an embodiment of the present invention. The user can select a size check menu from displayed menus by applying a long touch to a predetermined product on a webpage, or directly select size information (e.g., 15 cm) included in the product. When the size check menu or the size information is selected, the controller 180 automatically activates the LDAF function (LDAF ON).

In the activated state of the LDAF function, when the user horizontally moves his or her hand or the mobile terminal, the controller 180 measures the distance between the terminal and their hand by the aforementioned method, and outputs an alarm or vibration when the measured distance is equal to the length (e.g., 15 cm) of the product which is currently output on a screen.

As another embodiment, the controller 180 can compare the measured distance with the length (15 cm) of the product, and output different alarms/vibrations when the measured distance is shorter than, equal to and greater than 15 cm. As another embodiment, when the reference object is a wearable device, the length of the measured product can be output on a screen of the wearable device.

Figure 12:
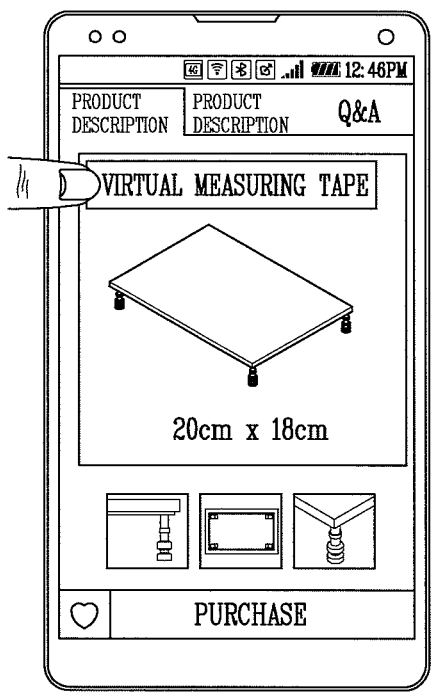
FIG. 12 is a view illustrating one example of size information related to a product which is output when a virtual measuring tape function is selected online.

FIG. 12 is a view illustrating one example of size information related to a product which is output when a virtual measuring tape function is selected online. One embodiment of the present invention can measure a horizontal length and a vertical length of a product according to a user selection in a separate or continuous manner.

Also, when the user measures one of the horizontal length and the vertical length of the product, once the one is measured, information asking the user whether or not to continue the measurement can be provided. For example, when the horizontal length of the product is measured, a message for checking whether or not to measure the vertical length can be output.

As illustrated in FIG. 12, when a virtual measuring tape image is selected, the controller 180 can output size information related to a product, for example, a horizontal length and a vertical length of the product, in cooperation with the virtual measuring tape. The size information related to the product, as illustrated in FIG. 12, can be output in the form of 20 cm×18 cm directly on the product or below the product. When the size information is selected, the controller 180 automatically activates the LDAF function (LDAF ON).

Figure 13:
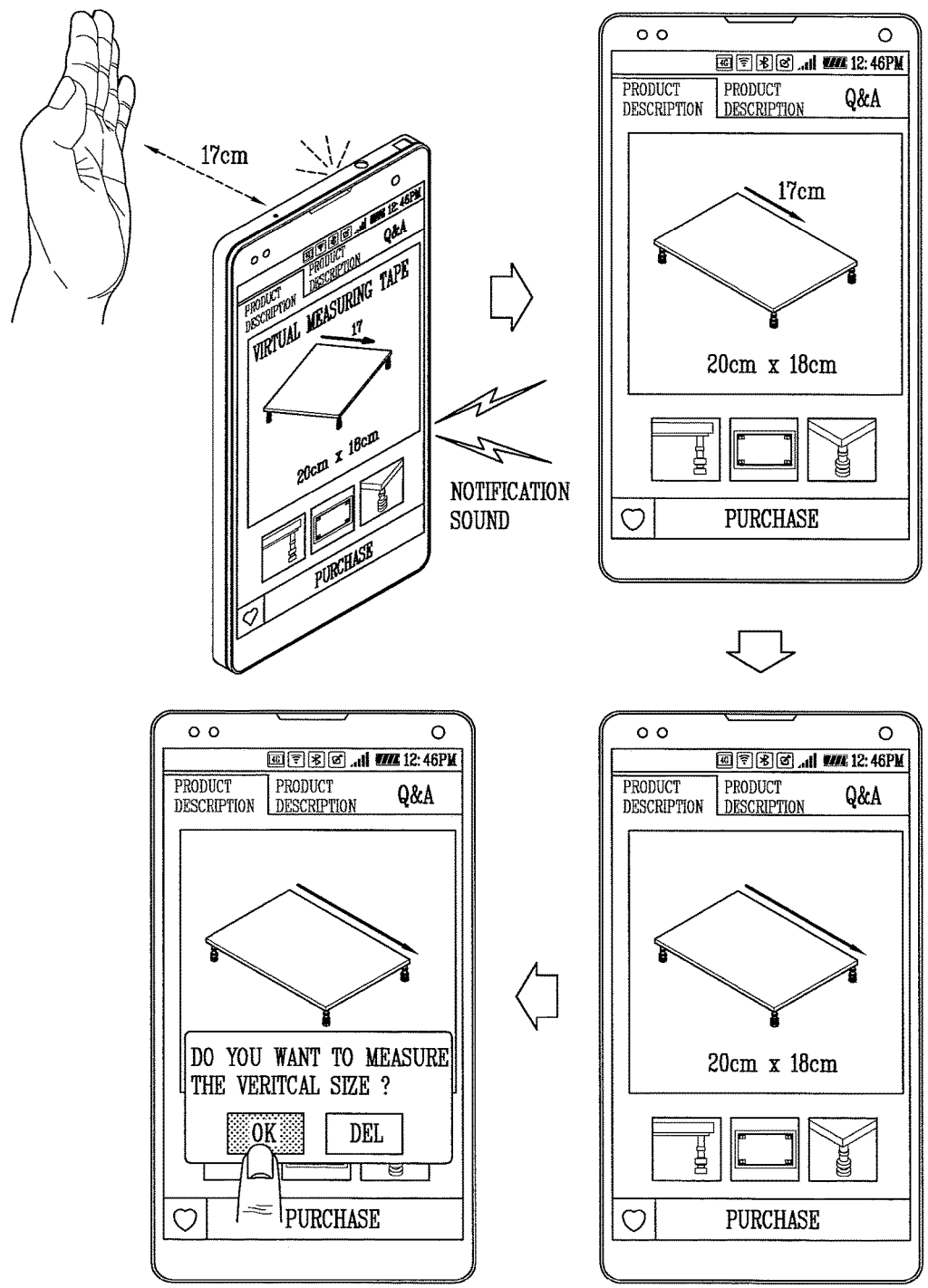
FIG. 13 is a view illustrating an embodiment of checking horizontal and vertical sizes of a product output online in an individual manner.

FIG. 13 is a view illustrating an embodiment of checking horizontal and vertical sizes of a product output online in an individual manner. When a virtual measuring tape image is selected, the controller 180 outputs size information, for example, a horizontal length and a vertical length below a product in cooperation with the virtual measuring tape. The user can select the horizontal length, the vertical length or both from the length information in a touching manner, so as to measure a horizontal size and a vertical size of the product in a separate or continuous manner. When the size information is selected, the controller 180 automatically activates the LDAF function (LDAF ON).

Hereinafter, for the sake of explanation, description will be given of an example in which a hand is selected as a reference object and horizontal information is selected. As discussed above, the hand can be of the user holding the mobile terminal or another user (e.g., a friend). After selecting the horizontal information (20 cm), when the user moves the hand, which is in a contact state with the terminal, away from the terminal, the controller 180 outputs a sound that the measuring tape is unrolled through the audio output module 152 and emits laser light to the hand, thereby measuring a distance (a spaced distance) between the mobile terminal and the hand. The controller 180 outputs on the product the horizontal size corresponding to the measured spaced distance of the hand and an icon (e.g., an arrow, %) indicating a measurement progress rate.

Afterwards, when the measured spaced distance of the hand gets close to the horizontal length (20 cm) of the product, the controller 180 outputs sound or vibration at a short interval. When the measured spaced distance is equal to the horizontal length (20 cm) of the product, the controller 180 outputs a warning sound, such as a vibration/notification sound, at a long interval.

When the measurement of the horizontal length of the product is completed, the controller 180 displays a popup window, and outputs a message asking the user whether or not to measure even the vertical length of the product. The user can select an OK button, repetitively perform the aforementioned method, and thereby measure (check) the vertical length of the product. As another embodiment, when the message is not popped up, the user can select the vertical length (e.g., 18 cm) directly from length information (20 cm×18 cm), thereby measuring the vertical size of the product.

One embodiment of the present invention has first measured the horizontal length of the product, followed by the measurement of the vertical length. However, the present invention is not limited to this. The same result can be obtained even though the vertical length is measured earlier than the horizontal length.

Figure 14:
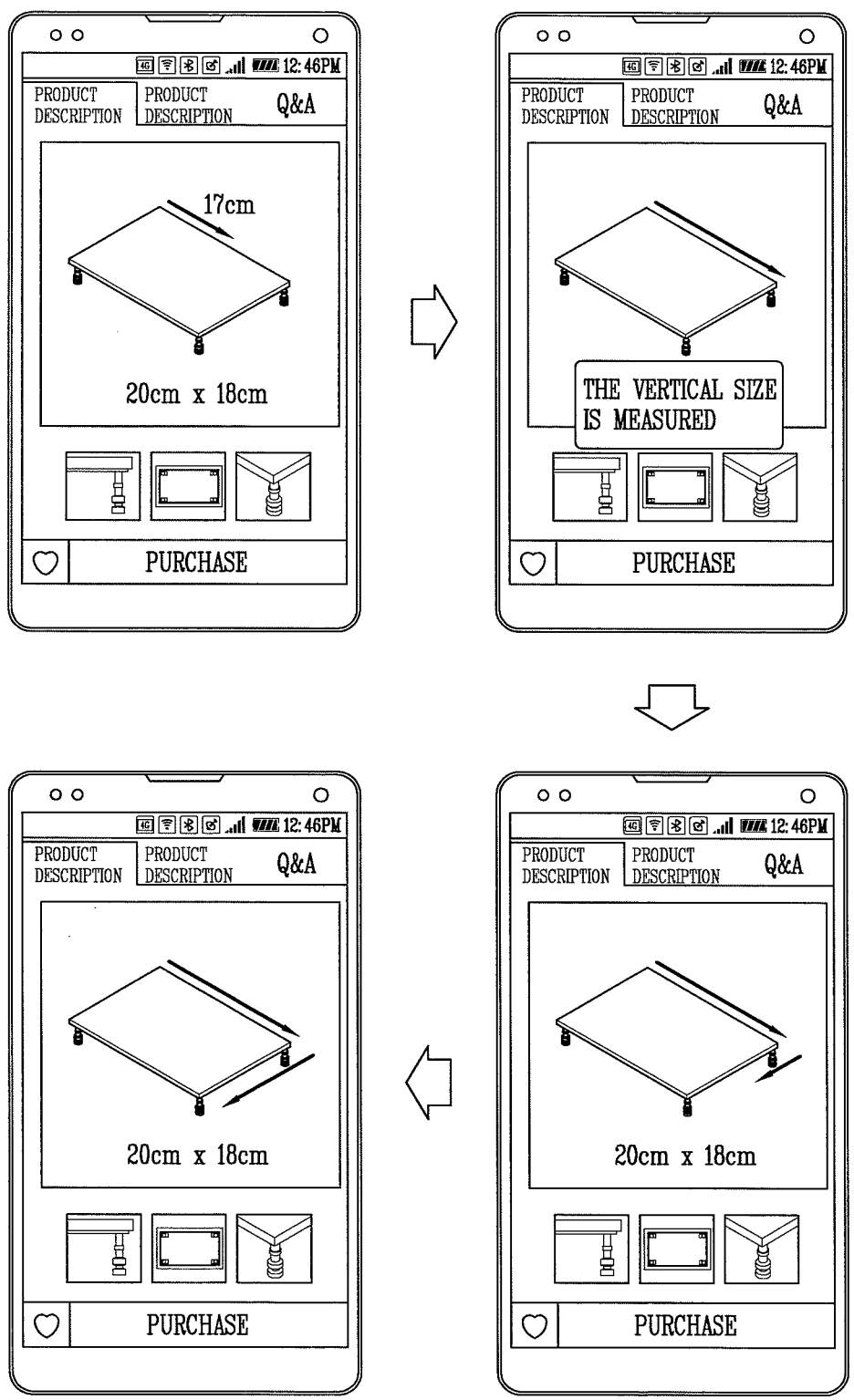
FIG. 14 is a view illustrating an embodiment of continuously checking horizontal and vertical sizes of a product output online.

Next, FIG. 14 is a view illustrating an embodiment of continuously checking (measuring) horizontal and vertical sizes of a product output online. As illustrated in FIG. 14, when both of the horizontal length and the vertical length are selected from the size information provided below the product, the controller 180 automatically activates the LDAF function.

When the hand which is in a contact state with the terminal starts moving away from the terminal, the controller 180 outputs a sound that the measuring tape is unrolled through the audio output module 152 and emits laser light to the hand, thereby measuring the distance (spaced distance) between the mobile terminal and the hand. The controller 180 outputs on the product the horizontal length corresponding to the measured spaced distance of the hand and an icon (e.g., an arrow, %) indicating a measurement progress rate.

Afterwards, when the measured spaced distance of the hand gets close to the real horizontal length (20 cm) of the product, the controller 180 outputs sound or vibration at a short interval. When the measured spaced distance is equal to the actual horizontal length (20 cm), the controller 180 outputs a warning sound, such as a vibration/notification sound, at a long interval. When the horizontal length of the product is completely measured, the controller 180 outputs a message indicating the start of the measurement of the vertical length, repetitively performs the aforementioned method, and thereby measures the vertical length of the product.

FIGS. 13 and 14 exemplarily illustrate that the user directly selects the length information so as to selectively measure the horizontal length and the vertical length of the product. However, the present invention is limited to this. The controller 180 can also automatically measure the horizontal length and the vertical length of the product. Thus, the mobile terminal may use a tilt sensor and a gyro sensor.

Figure 15A:
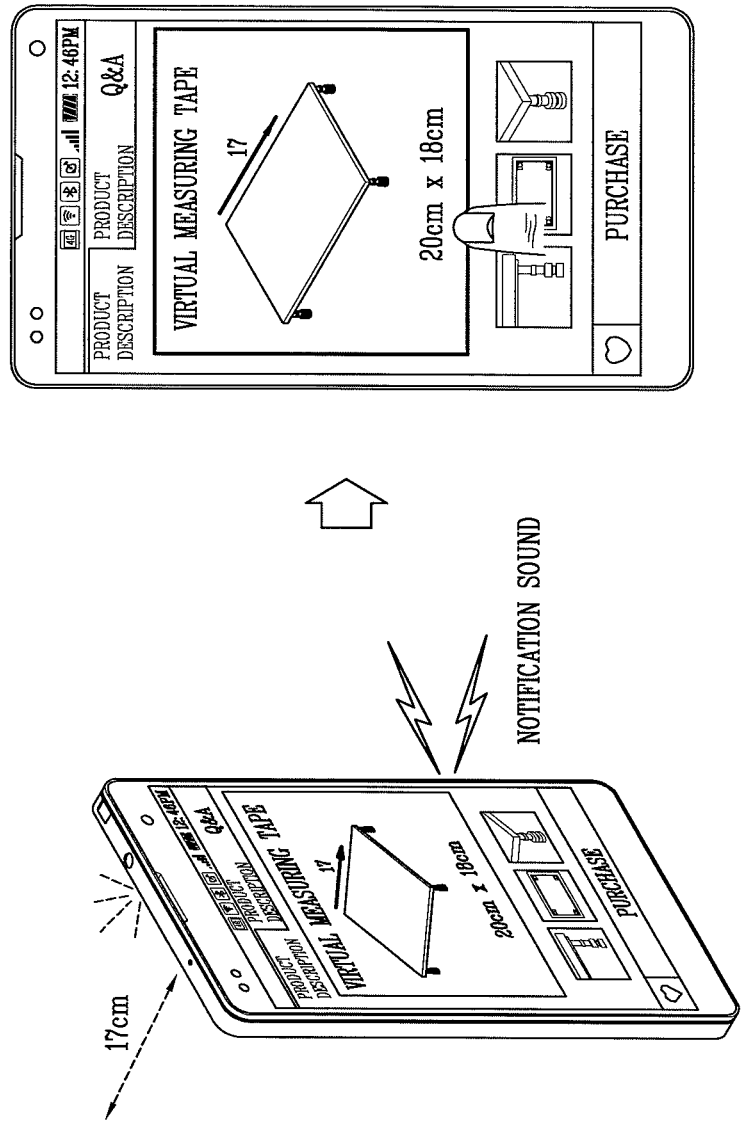
FIGS. 15A and 15B are views illustrating an embodiment of automatically measuring horizontal and vertical sizes of a product online according to an orientation (direction) of a terminal or a reference object.
Figure 15B:
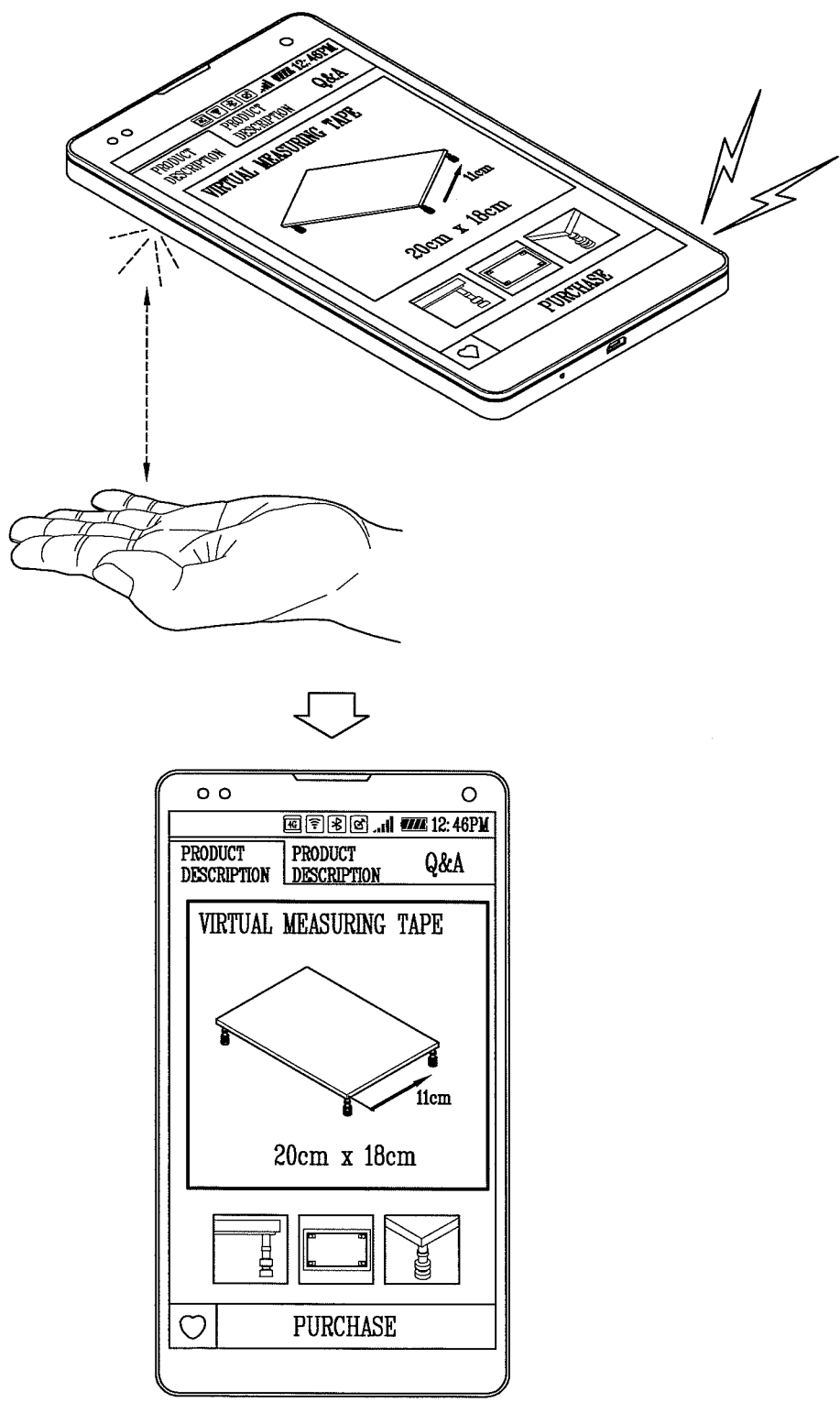

Next, FIGS. 15A and 15B are views illustrating an embodiment of automatically measuring horizontal and vertical sizes of a product online according to an orientation (direction) of a terminal or a reference object. When a vertical measuring tape image is selected, the controller 180 outputs size information (or length information), for example, a horizontal length and a vertical length, below a product, in cooperation with the virtual measuring tape. The user can measure the horizontal length (or the horizontal size) of the product by horizontally moving the terminal and the reference object (FIG. 15A), and measure the vertical length (or the vertical size) of the product by vertically moving the terminal and the reference object (FIG. 15B). The controller 180 can sense the horizontal movement or the vertical movement of the terminal and the reference object, to automatically measure the horizontal size and the vertical size of the product.

First, as illustrated in FIG. 15A, when the hand as the reference object is horizontally moved away from the terminal while the terminal is fixed, the controller 180 checks a state (i.e., the vertical state) of the terminal using the tilt sensor and the gyro sensor, and thereafter emits laser light to the hand, thereby automatically measuring the distance (i.e., a spaced distance) between the mobile terminal and the hand. The controller 180 outputs on the product the horizontal size of the product corresponding to the measured spaced distance of the hand and an icon (e.g., an arrow, %) indicating a measurement progress rate.

Afterwards, when the measured spaced distance of the hand gets close to the horizontal length (20 cm) of the product, the controller 180 outputs sound or vibration at a short interval. When the measured spaced distance is equal to the real horizontal length (20 cm), the controller 180 outputs a warning sound, such as a vibration/notification sound, at a long interval.

When the horizontal length of the product is completely measured, as illustrated in FIG. 15B, the user changes positions of the terminal and the hand. The controller 180 applies a signal for activating the camera after outputting the warning sound of the vibration/notification sound (after checking the horizontal length). The controller 180 then recognizes the change in the shape or direction of the hand based on an image obtained by the camera, thereby sensing that the hand has changed from a horizontal state into a vertical state. Here, since the camera is used only for sensing the status change of the hand (vertical state horizontal state), a preview screen is not output. Also, the controller 180 can recognize that the user desires to measure the vertical length of the product based on the state (horizontal state) of the terminal The controller 180 checks the horizontal state of the terminal using the tilt sensor and the gyro sensor, and emits laser light to the hand, thereby automatically measuring the distance (spaced distance) between the mobile terminal and the hand. The controller 180 outputs on the product the horizontal size corresponding to the measured spaced distance of the hand and an icon (e.g., an arrow, %) indicating a measurement progress rate. Afterwards, when the measured spaced distance of the hand gets close to the horizontal length (18 cm) of the product, the controller 180 outputs sound or vibration at a short interval. When the measured spaced distance reaches the actual vertical length, the controller 180 outputs a warning sound, such as a vibration/notification sound, at a long interval.

Figure 16:
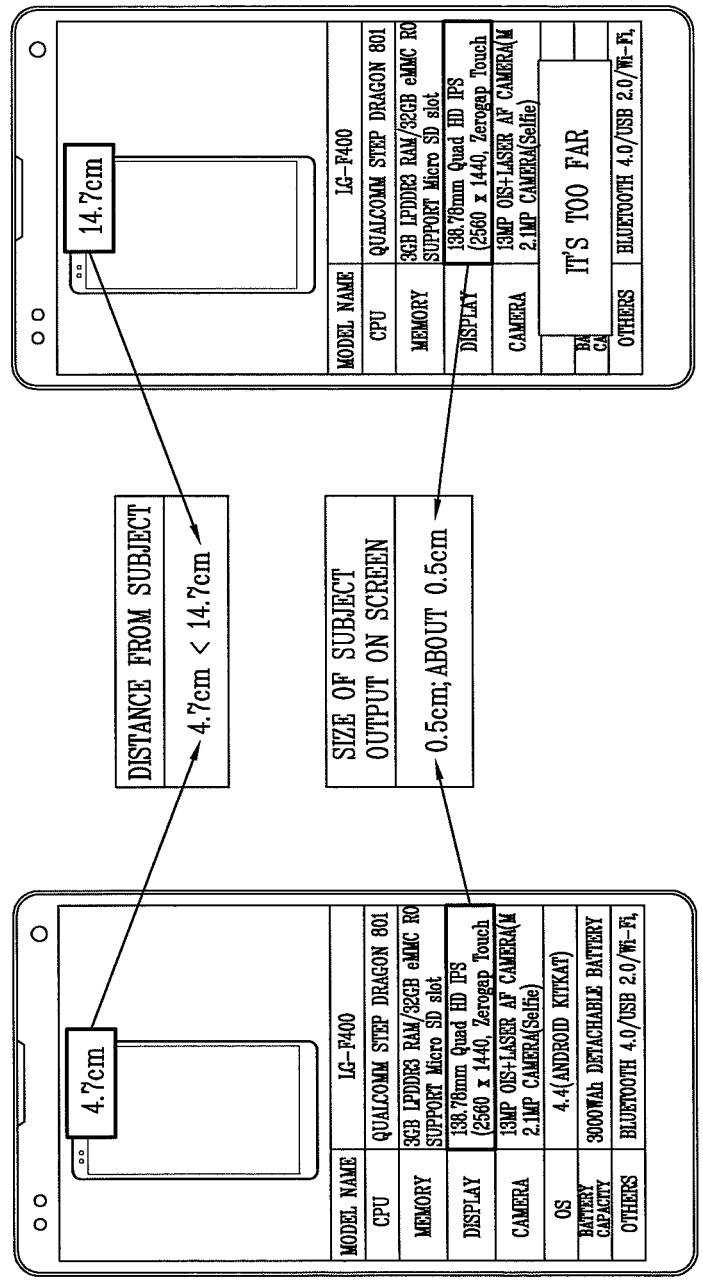
FIG. 16 is a view illustrating an embodiment of an automatic zooming method using a measured distance.

FIG. 16 is a view illustrating an embodiment of an automatic zooming method using a measured distance. The present invention can constantly maintain a size of a subject output on a screen even if the distance up to the subject changes due to a movement of the terminal. Thus, one embodiment of the present invention can use an auto zooming technology.

When the user selects a smart measuring tape menu and thereafter orients the camera of the terminal to face a subject located at the front of or below the terminal, the controller 180 measures the distance between the terminal and the subject, and outputs the measured distance on one side of a preview screen (e.g., a center of an upper portion of the screen). In this state, when the user moves the terminal close to the subject or away from the subject, the controller 180 measures each distance up to the moved subject, and outputs the measured distance on the screen. For example, when an initial distance is assumed as 4.7 cm, the distance is output as 14.7 cm.

However, when a camera is close to a subject, the subject typically looks large, and when the camera is moved away from the subject, the subject looks small. Specifically, this becomes severe when the subject includes text or an image. Therefore, one embodiment of the present invention can preset a threshold value according to the distance variation, so as to constantly maintain a size of a subject output on a screen using a zooming function, when measuring the distance between the mobile terminal and the subject using the LDAF function. For example, as illustrated in FIG. 16, under assumption that a size of text included in the subject is 0.5 cm when the distance between the terminal and the subject is 4.7 cm, even if the distance between the terminal and the subject increases up to 14.7 cm, 0.5 cm as the size of the text included in the subject is maintained. The threshold value according to the distance variation may be set by the user in the smart measuring tape menu. When it is not set, a default value is used.

Also, one embodiment of the present invention can set a limit value of the distance between a terminal and a subject. The limit value is a limit distance at which the subject is difficult to be sharply in focus due to a too short or too long distance between the terminal and the subject. When reaching the limit value or limit distance, the controller 180 notifies it to the user by popping up a message at one side of a preview screen (e.g., a lower end of the screen).

The smart measuring tape menu according to an embodiment of the present invention can include, as sub menus, a normal ruler menu and a virtual measuring tape menu. When the normal ruler menu is selected, a ruler (or measuring tape) image is output on a screen.

Figure 17A:
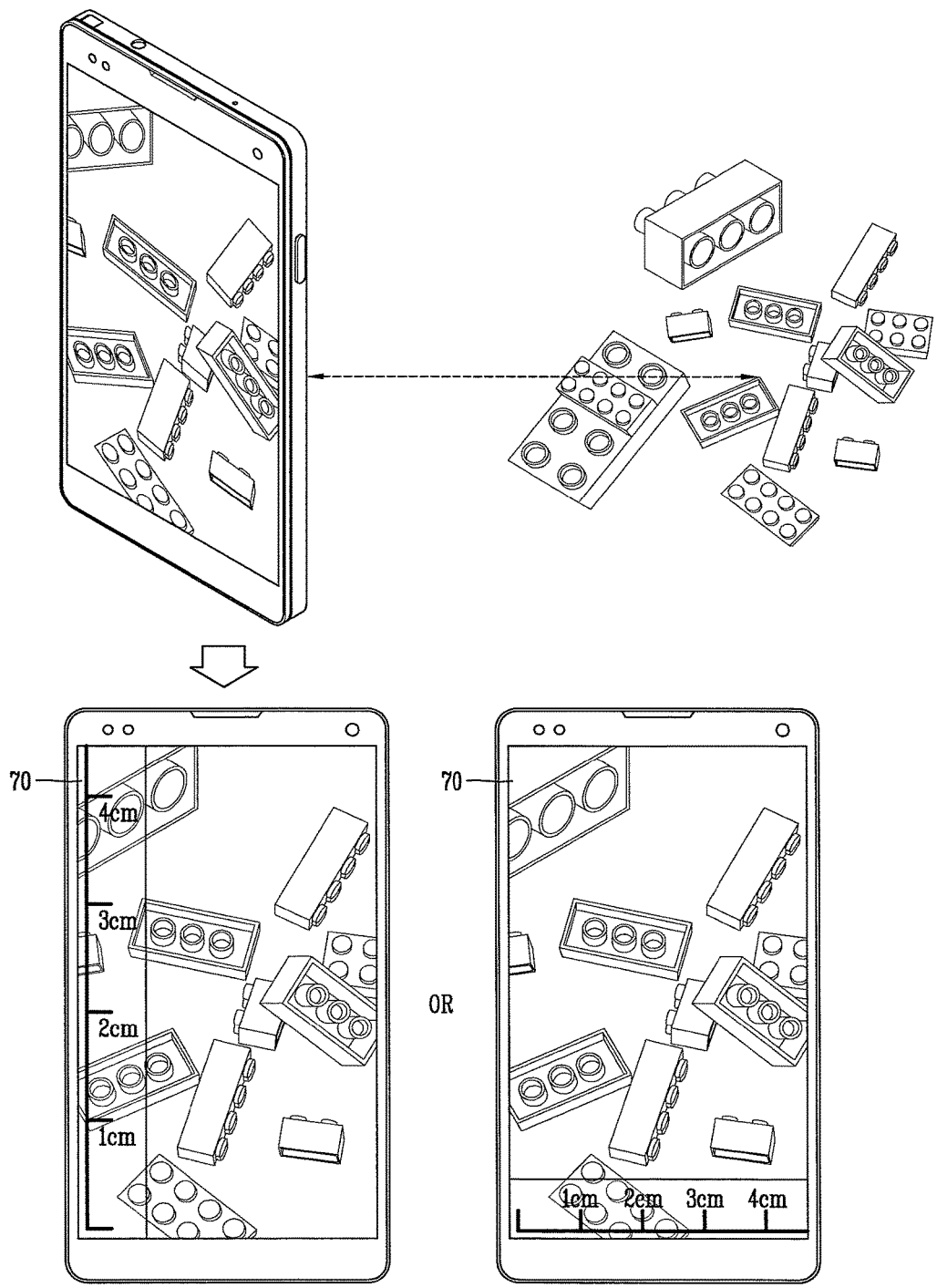
FIGS. 17A and 17B are views illustrating an embodiment of measuring a size of a subject on a preview screen by using a measuring tape function.
Figure 17B:
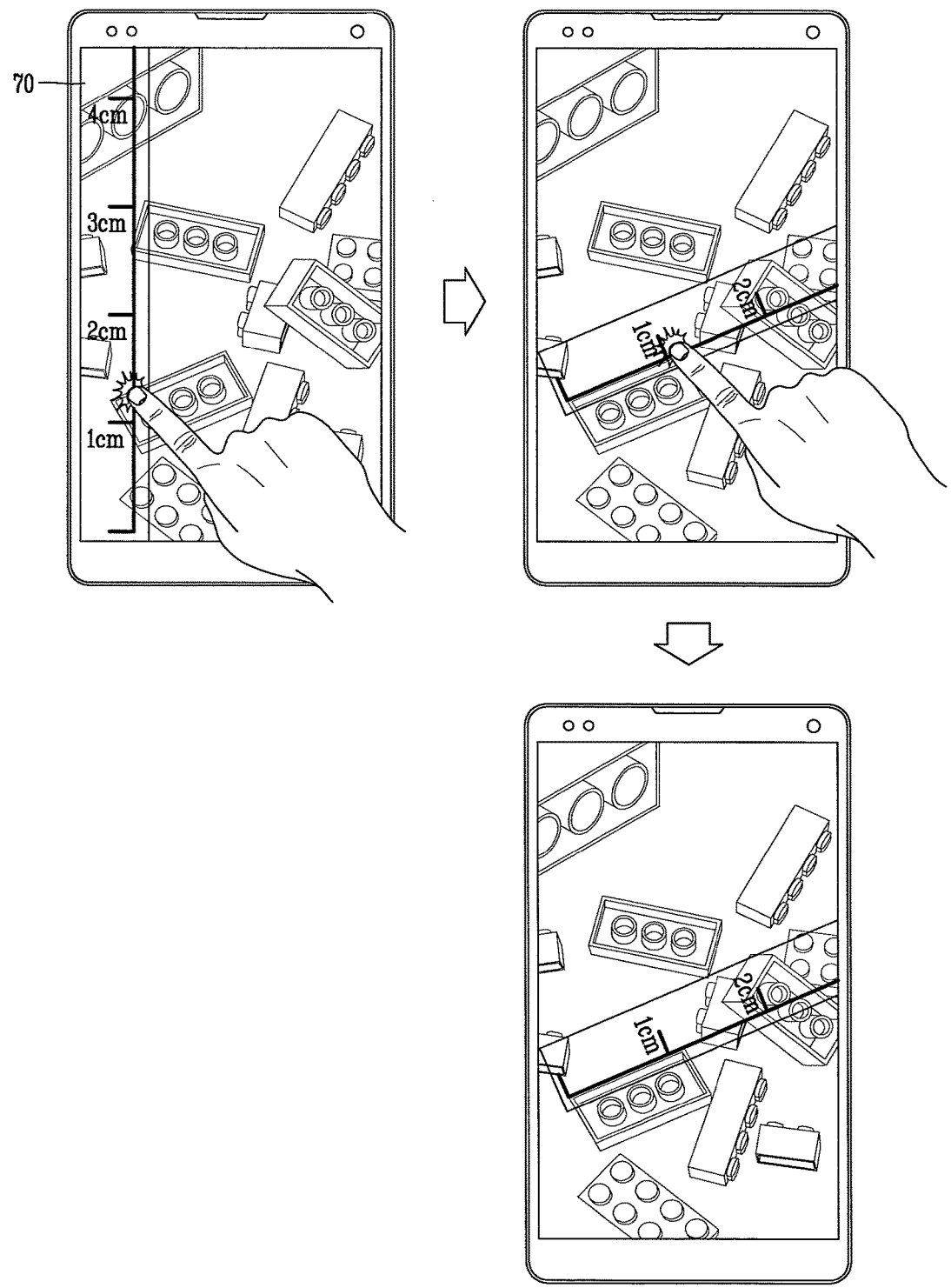

Next, FIGS. 17A and 17B are views illustrating an embodiment of measuring a size of a subject by using a measuring tape function on a preview screen. As illustrated in FIG. 17A, when the normal ruler menu (or function) is selected, the controller 180 outputs a ruler image 70 (hereinafter, referred to as 'ruler') for measuring a real size of a subject, on one side of a screen. The ruler 70 may be output in a vertical or horizontal direction according to an output shape of the subject. When the user applies a long touch to a specific point of the ruler image 70, the ruler image 70 is moved for output, starting from the corresponding point as a start point.

The ruler 70 may be output when being selected from the smart measuring tape menu or when a long touch is applied to one side (e.g., up/down/left/right) of a preview screen. The ruler 70 may be released by being dragged out of the screen.

Hereinafter, an operation of measuring a real size of a subject using the ruler image 70 will be described. As illustrated in FIG. 17B, after the user applies a long touch to one point of the ruler 70 corresponding to one side of a subject, when the user sets an end point by dragging the touch along the subject, starting from the corresponding point as a start point, and releasing the touch on another side of the subject, the controller 180 outputs the ruler 70 to be placed in parallel to the two points. Therefore, the user can measure a size of the subject using the ruler 70. As another method, after applying a long touch to the ruler 70, when two points of a subject length of which is desired to be measured are set, the controller 180 can control the ruler 70 to be output in parallel to the two points. The measured size (length) of the subject is output on one side of the screen.

Figure 18:
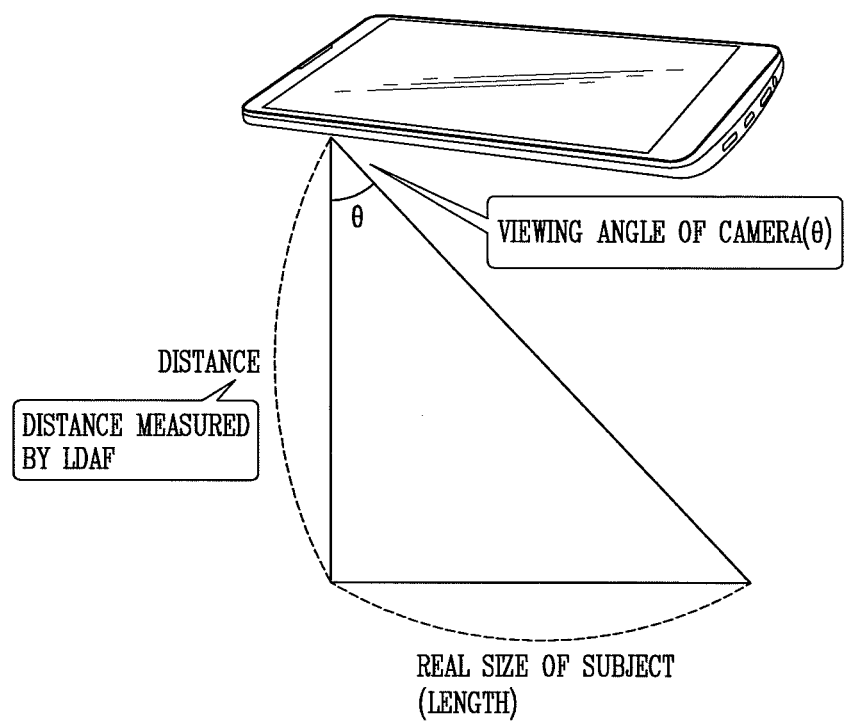
FIG. 18 is a view illustrating a concept of measuring a real size of a subject output on a screen according to an embodiment of the present invention.

FIG. 18 is a view illustrating a concept of measuring a real size of a subject output on a screen according to an embodiment of the present invention. As illustrated in FIG. 18, the controller 180 can measure a real size (horizontal length) of a subject using a trigonometric function. Thus, the controller 180 measures the distance up to the subject using an LDAF function, and calculates a viewing angle and a zooming ratio of a camera. The measured size is output on a screen according to a user request.

Therefore, the controller 180 measures a length of the subject using the calculated viewing angle Θ of the camera and the calculated distance value of the subject according to the following Equation 1.

$$\tan(\Theta)=\text{Distance}/\text{Length} \quad \text{(Equation 1)}$$

Real length of subject=tan (Θ)*distance of subject

When a current zooming value is applied to the obtained length of the subject, the real length of the subject output on a screen may be measured. The measured real length of the subject is stored in the memory 170, and is applied to an embodiment of checking (or measuring) a real length of a captured image later.

FIG. 19 is a view illustrating one example of outputting a real size of a subject according to a spaced distance of the subject. According to an embodiment of the present invention, graduations of a ruler may vary when magnification or a spaced distance changes upon activating a ruler (or a measuring tape), which may allow for judging a length of a target.

As illustrated in FIG. 19, while the ruler 70 is output on a preview screen, when the magnification of the preview screen is changed or a size of a subject is changed due to a changed distance up to the subject, the controller 180 changes the intervals of the gradations of the ruler 70 by measuring a real length of the ruler 70 according to the method illustrated in FIG. 18. Therefore, the user can easily check (measure) the real length of the subject by using the ruler even when the screen magnification or the distance varies.

One embodiment of the present invention can output a guide line to judge a size of a specific product (or subject), other than outputting the ruler (or the measuring tape), when capturing only the specific product by activating the smart measuring tape function. If a plurality of products are captured, those products may be designated in a touching manner or an area of those products may be designated by applying a drag touch on a screen.

Figure 20:
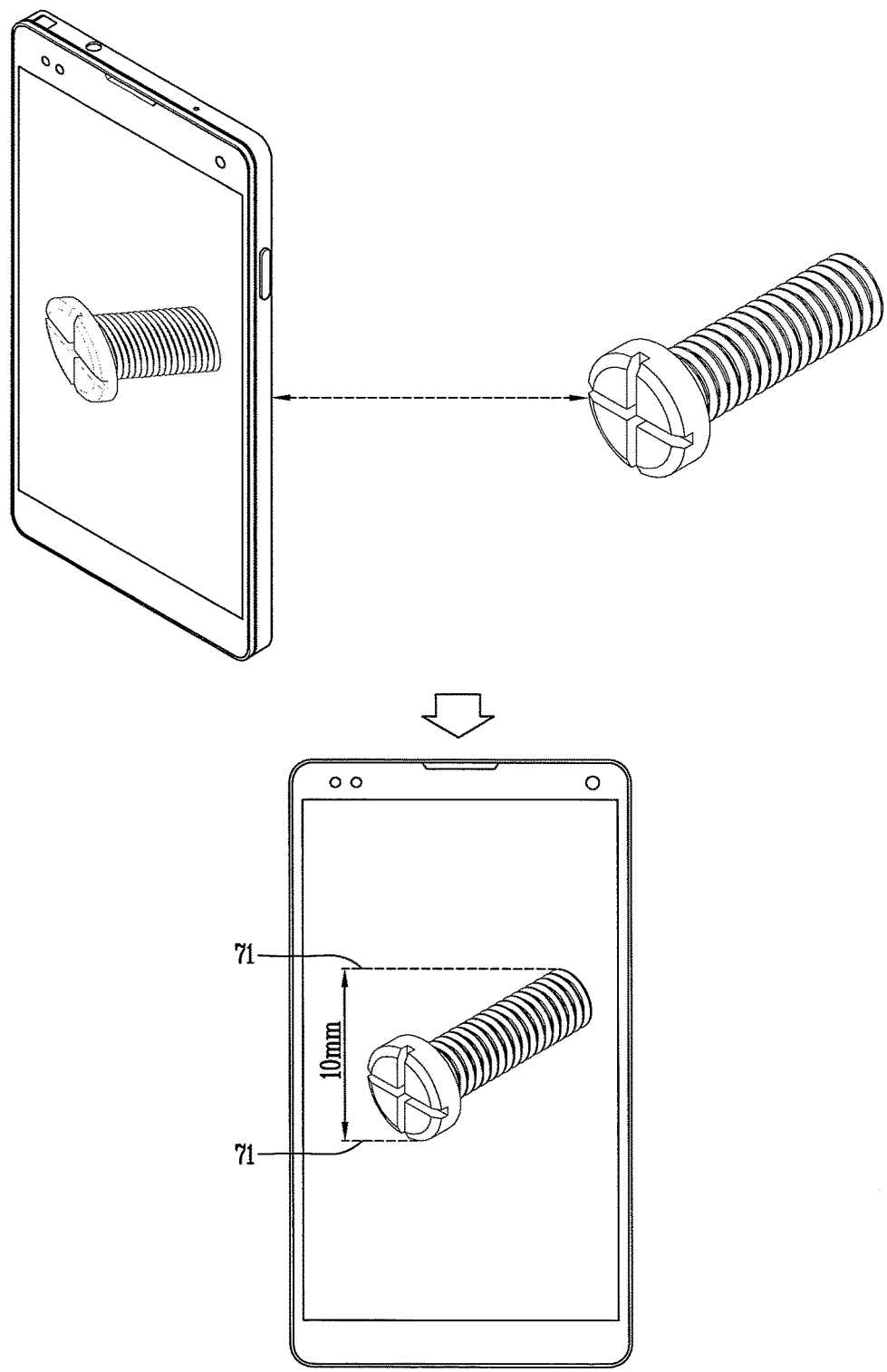
FIG. 20 is a view illustrating an embodiment of outputting a real size of a captured subject using a guide line.

FIG. 20 is a view illustrating an embodiment of outputting a real size of a captured subject using a guide line. As illustrated in FIG. 20, when an image of a subject which has been captured by activating a ruler (or measuring tape) function is activated, guide lines are output on the captured image (e.g., photo) of the subject. The guide lines 71 include a real length (e.g., 10 cm) of the subject. The guide lines 71 may disappear after a predetermined time, and be redisplayed when a long touch is applied to the corresponding subject.

Figure 21:
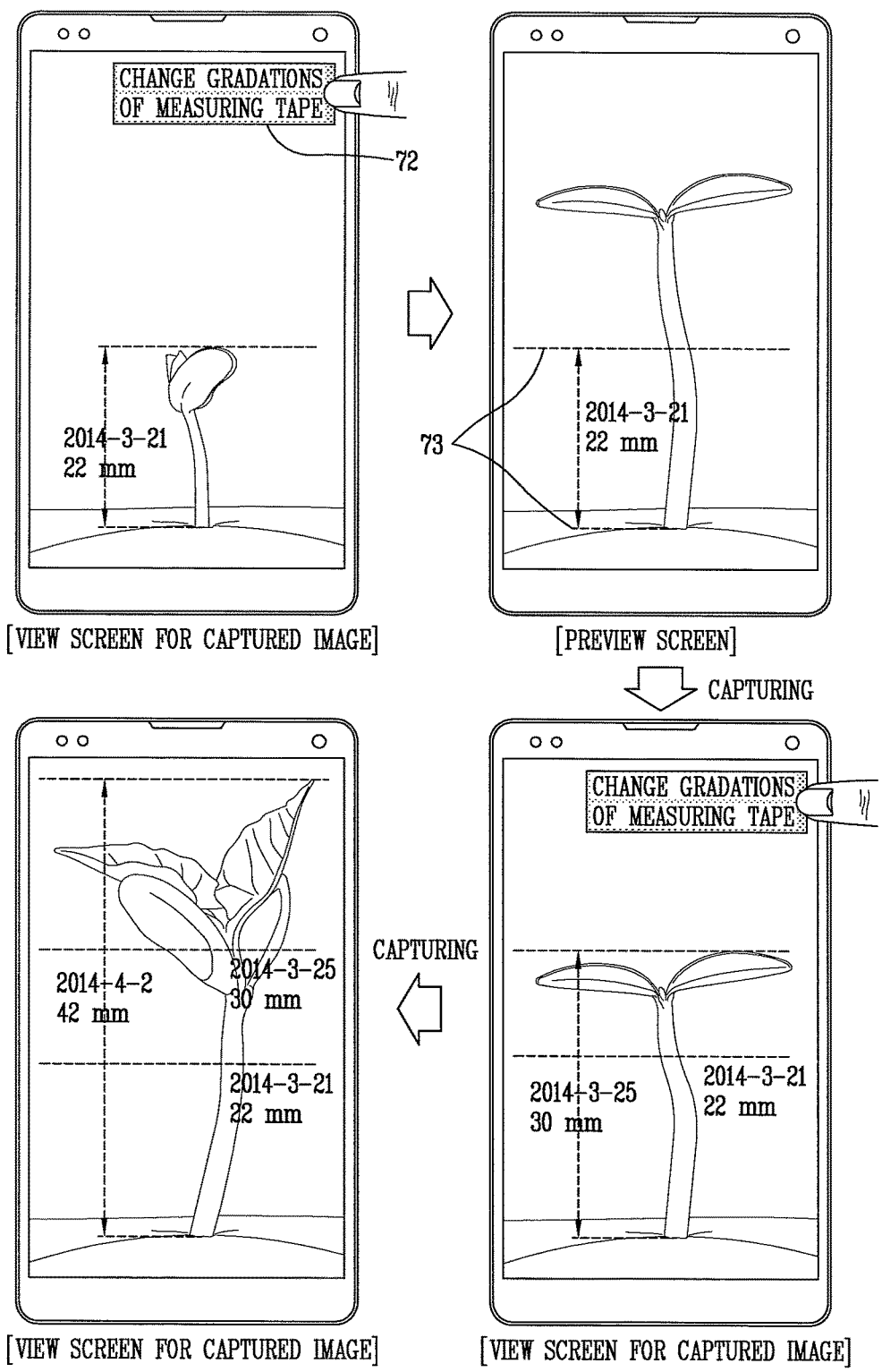
FIG. 21 is a view illustrating an embodiment of continuously capturing a subject, which has been captured using a ruler function, according to a lapse of time.

FIG. 21 is a view illustrating an embodiment of continuously capturing a subject, which has been captured using a ruler function, according to a lapse of time. When the user outputs an image (e.g., photo) of a subject captured by activating the ruler (or measuring tape) function, the controller 180 outputs guide lines (or guide information) 73 together with a size (22 cm) of the subject and a captured date (Mar. 21, 2014) of the subject.

The user can select a "continuous capture" function on a view screen so as to continuously capture the subject after a lapse of a predetermined time. The function may be executed by selecting a 'continuous capture' button 72 provided on one side of the screen or selecting a 'continuous capture' menu on a popup window output when a long touch is applied to the view screen. When the continuous capture function is selected, the controller 180 automatically activates the ruler (or measuring tape) function.

The user can capture a grown state of the same subject on Mar. 25, 2014, by selecting the 'continuous capture' button 72. When the subject to be captured is output on a preview screen, the controller 180 outputs the guide lines 73, which relate to a size of the previously-captured subject (captured on Mar. 21, 2014) on the preview screen in an overlapping manner. The user can confirm with eyes how the subject has grown and also adjust a capturing composition of the subject, by viewing the guide lines 73. Here, the guide lines 73 may be utilized as a reference line for comparing the current subject with the previously-captured subject. When the user enlarges or reduces a size of the subject, the guide lines 73 are also enlarged or reduced in size according to the enlargement or reduction ratio.

When a capture button is selected, the controller 180 measures a size (30 cm) of the subject which has grown using the activated ruler function, and stores the measured size in the memory 170 together with a captured image. When the user outputs the captured image on the view screen, the controller 180 outputs at the guide lines 73 the first capture information (Date: Mar. 21, 2014 and Size: 22 mm) and the second capture information (Date: Mar. 25, 2014 and Size: 30 mm) together with the images of the subjects on the screen such that the user can intuitively recognize the changes in the subject.

According to the same method, the user can output a preview screen by selecting the 'continuous capture' button and thereafter capture another state of the subject on a different date (Apr. 2, 2014) with viewing the guide lines 73 output on the preview screen. Therefore, when the user outputs a finally-captured image on the view screen, the controller 180 outputs at the guide lines 73 the first capture information (Date: Mar. 21, 2014 and Size: 22 mm), the second capture information (Date: Mar. 25, 2014 and Size: 30mm) and the third capture information (Date: Apr. 2, 2014 and Size: 42 mm) together with the finally-captured image of the subject on the screen such that the user can intuitively recognize the changes in the subject.

Figure 22:
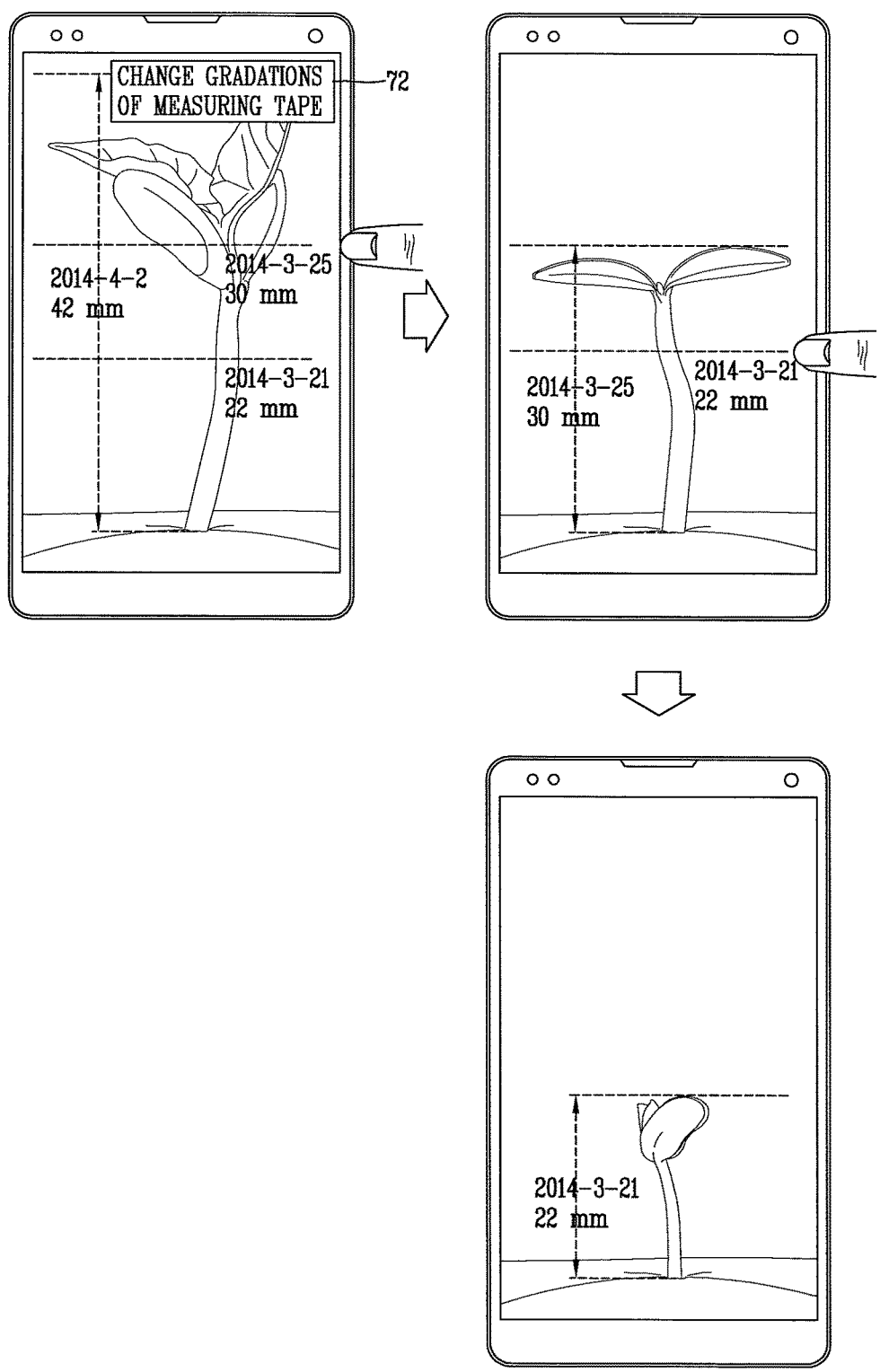

FIGS. 22 and 23 are views illustrating an embodiment of a method for outputting an image of a continuously-captured subject. As illustrated in FIG. 22, the user can select date information from an image of a subject captured by the "continuous capture" function, and thus check an individual image and its size captured at a specific date.

Also, as illustrated in FIG. 23, the user can view a full image using a touch gesture of touching the image of the subject captured by the "continuous capture" function with two fingers and pinching the two fingers out. That is, when the touch gesture is applied, the controller 180 reduces each captured image at a predetermined ratio, divides a screen, and outputs the images and their sizes on the view screen sequentially based on the captured date. The plurality of images output may be arranged and output along guide lines 71 or 73 such that the user can compare their sizes. When a touch gesture of pinching the fingers in is applied to the full image, the controller 180 restores the screen to the previous screen. Therefore, the user can view the changes in the subject according to the lapse of time on the view screen.

When a zooming magnification or a capturing distance is changed while capturing a subject using the smart measuring tape function, even though the same subject is output, a size of the subject viewed on the screen is different, which makes it difficult to judge a real size of the subject. To solve this problem, the present invention provides various methods for checking a real size of a captured image when the image is output on a screen.

Figure 24:
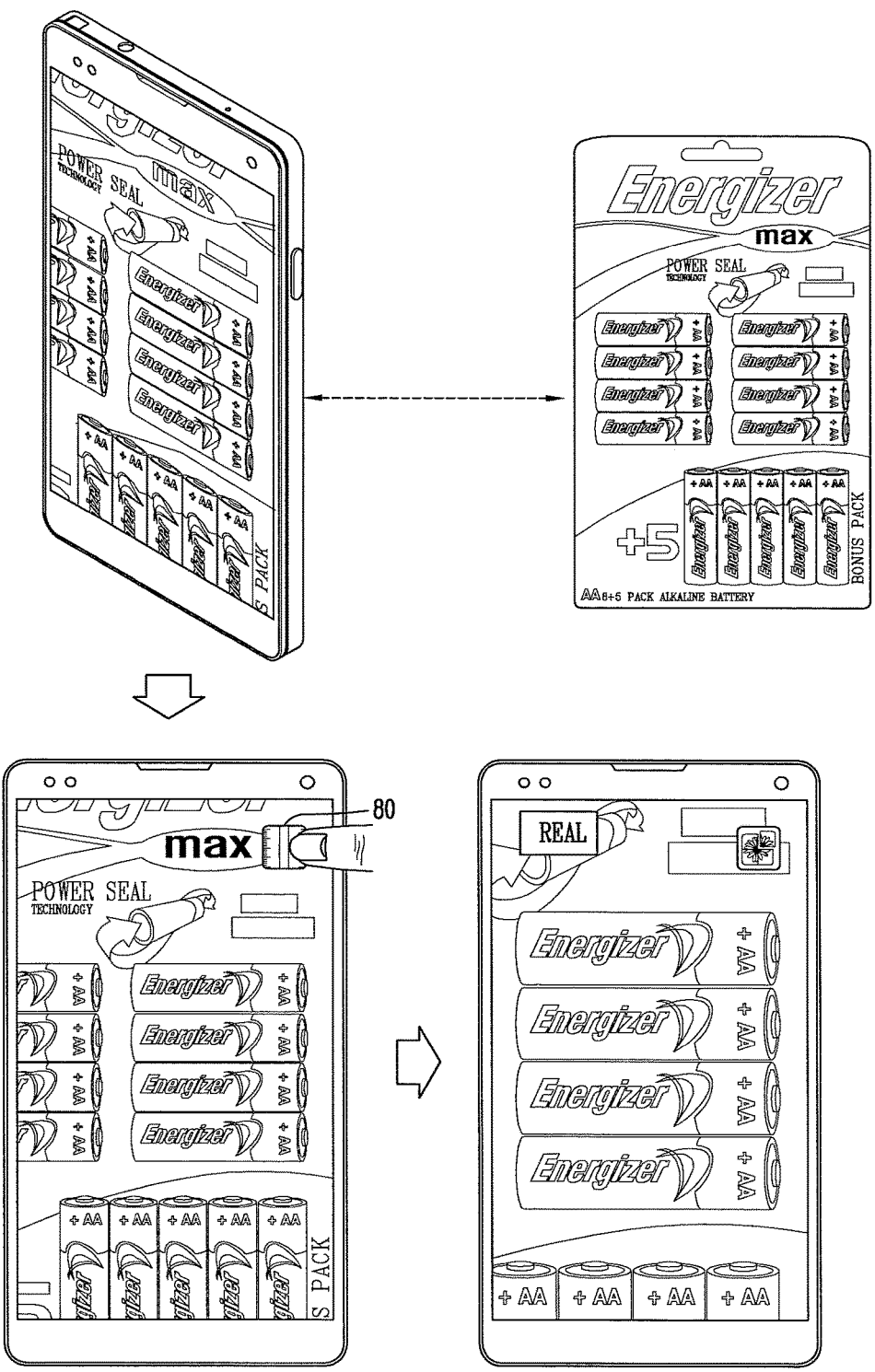
FIGS. 24 and 25 are views illustrating an embodiment of showing a real size of a captured image.
Figure 25:
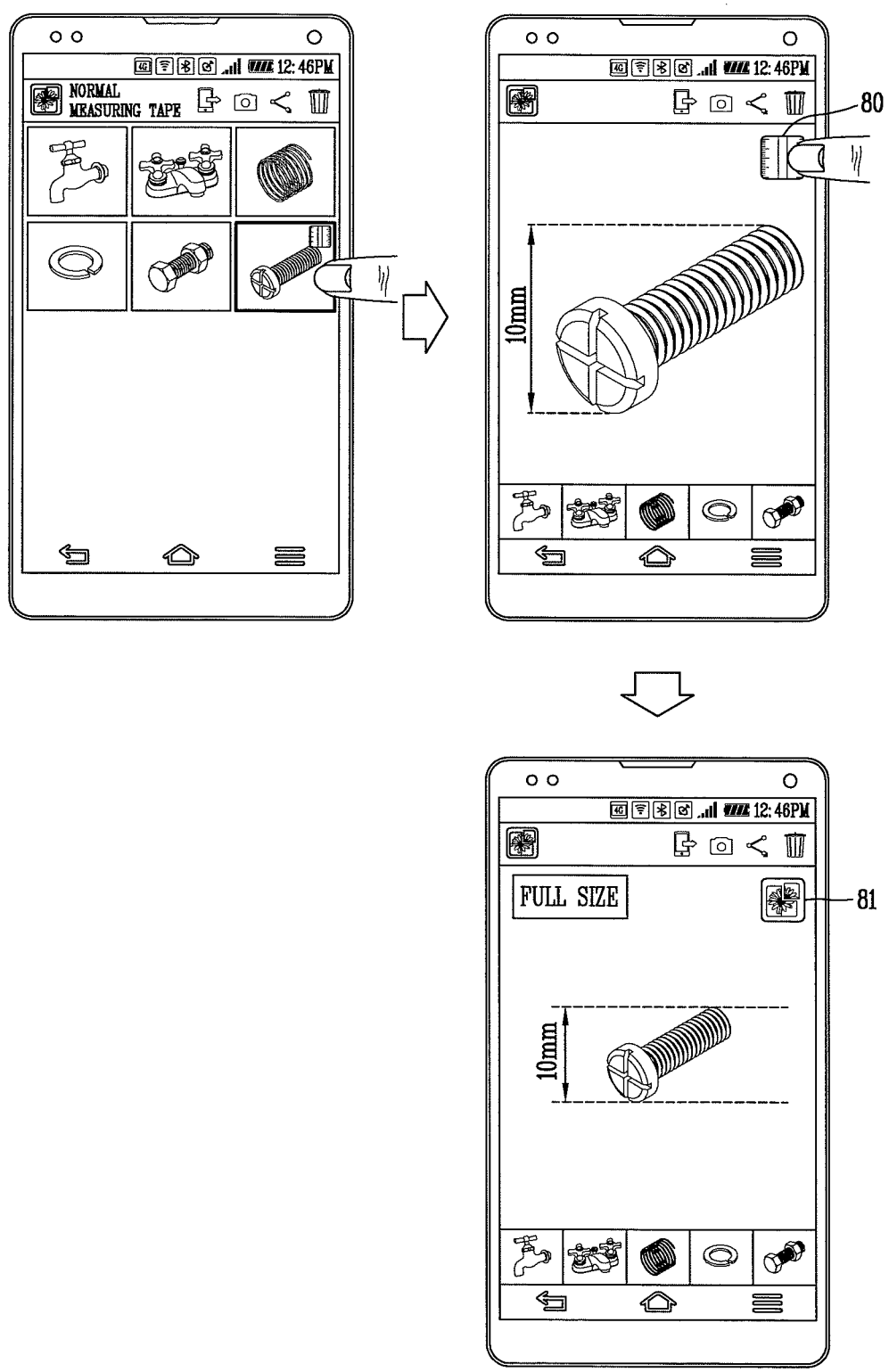

FIGS. 24 and 25 are views illustrating an embodiment of showing a real size of a captured image. As illustrated in FIG. 24, the user captures an image of a dry cell pack using a smart measuring tape function in order to purchase the dry cells. After entering a shop, when the user outputs the captured image on a screen, the controller 180 outputs an icon 80 for showing a real size of the dry cell on a right upper portion of the image. When the icon 80 is selected, the controller 180 displays the dry cell in its real size by enlarging or reducing the captured image, and also displays an icon (e.g., Real) indicating that the dry cell is currently output in its real size on the screen.

Here, the controller 180 recognizes type and size of the corresponding dry cell by analyzing information included in the captured image, and resizes (enlarges or reduces) the captured image into physically the same size as the real size of the dry cell. Therefore, the user can easily check a dry cell in a desired size by placing a dry cell displayed in a shop on a dry cell currently displayed on a screen.

The present invention can store an image (or photo) captured using the ruler function (or a normal measuring tape function) to be distinctive from other images For example, the image captured using the ruler function may be output along with an icon 80 for viewing a real size.

As illustrated in FIG. 25, when a screw image (or photo) is selected from a plurality of images captured by the normal ruler function, the controller 180 outputs the screw image on a screen in an enlarging manner, and also outputs the icon 80 for viewing the real size of the image on an upper portion of the screen. When the user selects the icon 80, the controller 180 outputs a ruler or a size for a specific product on one side of the screen.

That is, when the user selects the icon 80 for viewing the real size, the controller 180 resizes the screen into physically the same size as the size of the screw by considering resolution of the mobile terminal, thereby outputting the screw image in the real size. Also, the controller 180 outputs the icon (e.g., Real) indicating that the currently-output screw image is in the real size. The user can select an icon (gallery icon) 81 to return to the previous screen. Therefore, the user can easily check a screw in a desired size by placing another screw on a screw currently output on a screen for comparison.

Figure 26:
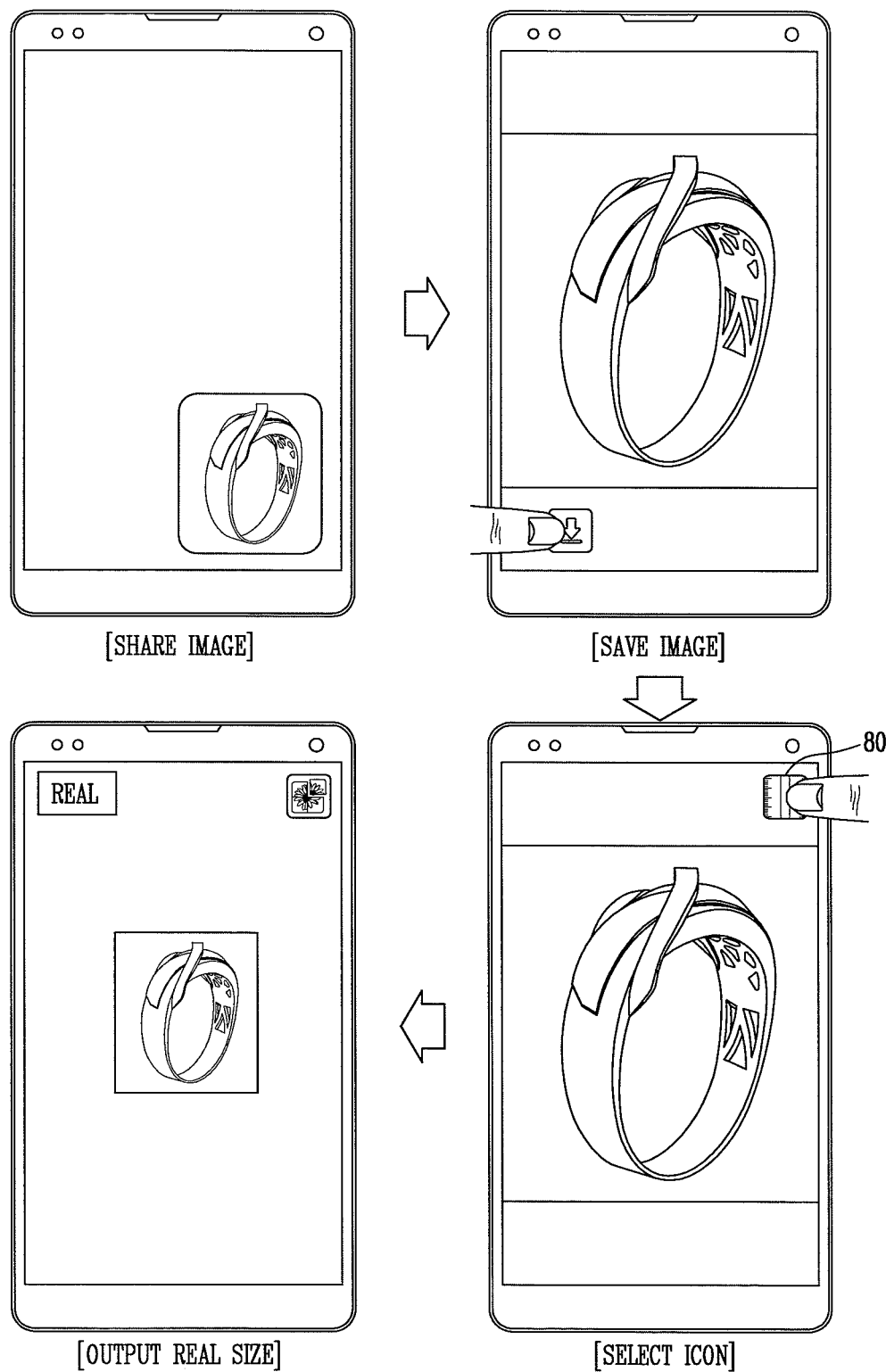
FIG. 26 is a view illustrating an embodiment of checking a real size of a shared image in another device according to an embodiment of the present invention.

FIG. 26 is a view illustrating an embodiment of checking a real size of a shared image in another device according to an embodiment of the present invention. As illustrated in FIG. 26, a captured ring image can be shared with another user, and the shared ring image is stored in a memory. Afterwards, when the ring image is output on the screen in an enlarged shape, when the another user selects the icon 80 for viewing the image in its real size, the controller 180 resizes the image based on a real size value of the ring prestored in the memory 170, and outputs the resized image.

Figure 27:
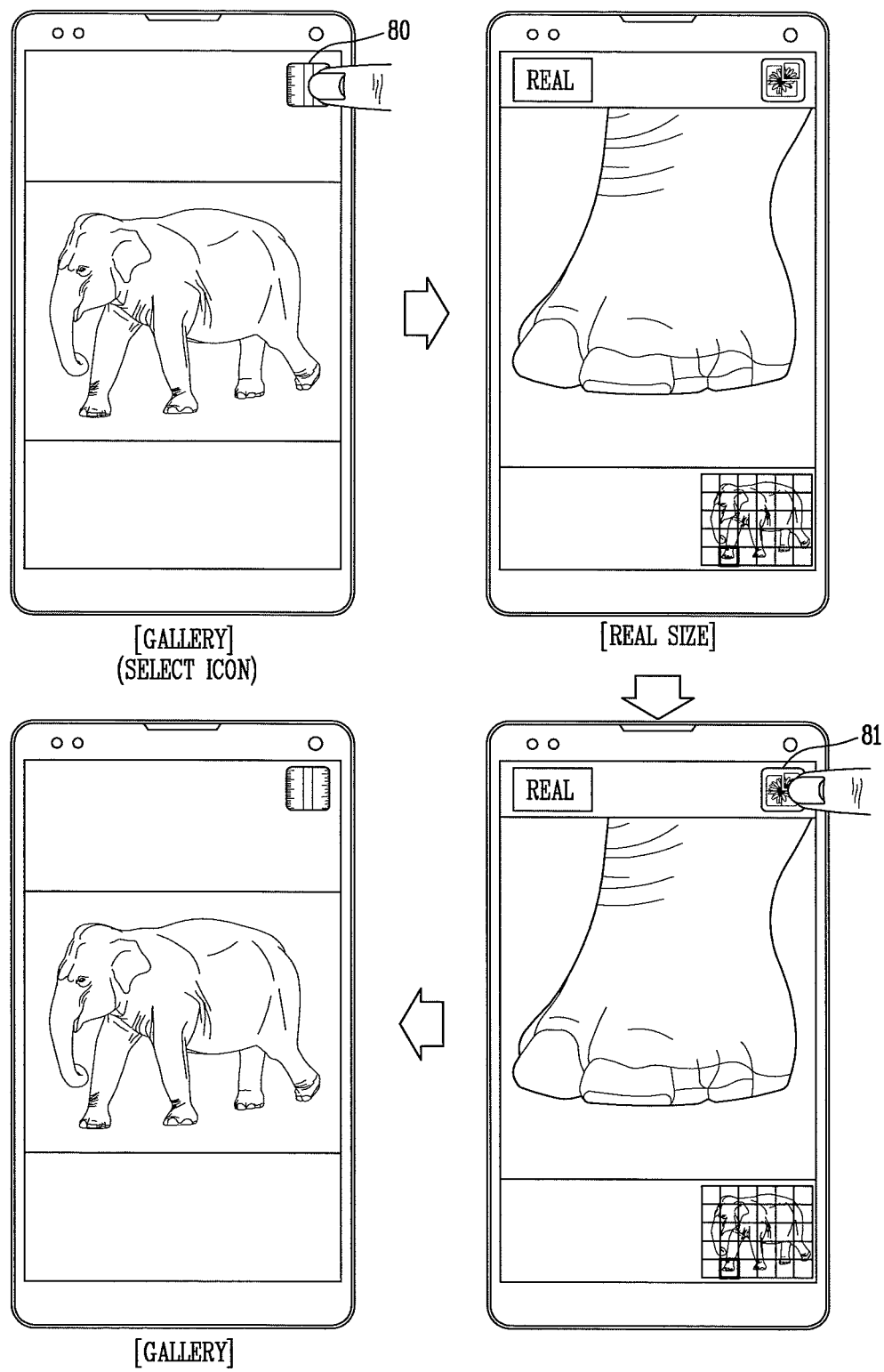
FIG. 27 is a view illustrating an embodiment of checking a real size of a subject in a puzzling manner.

FIG. 27 is a view illustrating an embodiment of checking a real size of a subject in a puzzling manner In the present invention, a subject whose real size can be checked by selecting the icon 80 should be smaller in size than the screen of the terminal and a captured image of a subject which is greater than the screen of the terminal is impossible to be viewed in a real size. To overcome this disadvantage, one embodiment of the present invention can divide a captured image of a subject which is greater than the screen of the terminal in size into a plurality of pieces, and output the divided pieces on a separate puzzle region 82 in a puzzling manner. Therefore, the user can check a real size by selecting a desired piece of the subject on the puzzle region 82.

As illustrated in FIG. 27, the user can capture a subject, for example, an elephant, which is greater than the screen of the terminal in size, and store the captured subject image. While the captured elephant image is output on the screen, when the user selects the icon 80, the controller 180 outputs the full elephant image on the puzzle region 82 located at a lower end of the screen in a dividing manner, and indicates, like a navigator, which piece of the elephant image is currently output in the real size on the screen. The user can select a piece desired to view from the full elephant image in the puzzle shape so as to check its real size. Afterwards, when the icon 81 is selected, the controller 180 restores the previous screen. In the present invention, size and length of a subject are used as the same meaning.

As aforementioned, one embodiment of the present invention can provide effects of showing a real size of a subject which is captured or has been captured through a camera, or facilitating for measurement and check of a size of a real subject or a subject on a screen, by applying the distance measuring function using a laser and a multifunctional smart measuring tape function to a capturing scene.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for measuring a length in a mobile terminal, the method comprising:
    selecting a virtual measuring tape function on the mobile terminal for measuring a size of an object;
    setting, via a controller of the mobile terminal, a reference object, the reference object including a palm;
    setting, via the controller, a spaced distance of the reference object with respect to the mobile terminal to be zero when the reference object is brought into contact with the mobile terminal and one end of a subject;
    measuring, via a laser of the mobile terminal, a horizontal length of the subject based on the spaced distance of the reference object with respect to the mobile terminal when the reference object is moved away from the mobile terminal and moved into another end of the subject;
    automatically measuring a vertical length of the subject based on a state change of the terminal or the palm without additional manipulation when the measurement of the horizontal length of the subject is completed;
    outputting at least one of the measured horizontal and vertical length of the subject;
    displaying, via a display unit of the mobile terminal, a webpage including an object and a size information of the object, the size information of the object including at least one of a horizontal length and a vertical length of the object;
    detecting selection of the horizontal length or the vertical length of the object; and
    outputting an alarm or vibration when the measured spaced distance of the reference object reaches to the selected horizontal length or the vertical length of the object displayed on the webpage while the reference object is moved away from the mobile terminal,
    wherein the virtual measuring tape function is automatically activated when the horizontal length or the vertical length of the object is selected.

2. The method of claim 1, further comprising:
    displaying, via a display unit of the mobile terminal, a virtual measuring tape menu for setting the reference object,
    wherein the reference object includes an object previously captured and registered, and a wearable device.

3. The method of claim 1, further comprising:
    outputting at least one of a warning sound and vibration when the reference object is moved outside a reference range and is not horizontally spaced from the mobile terminal.

4. The method of claim 1, further comprising:
    displaying a measuring tape image and horizontal and vertical state checking indicators indicating horizontal and vertical positions of the reference object with respect to the mobile terminal on the display unit.

5. The method of claim 1, further comprising:
    outputting a sound indicating the measuring tape is being unrolled as the reference object is moved away from the mobile terminal.

6. The method of claim 1, further comprising:
    outputting notification information when the measured spaced distance of the reference object reaches a user-set reference distance.

7. The method of claim 1, further comprising:
    displaying an icon for checking a real size of a captured image when the captured image is displayed on a screen;
    recognizing a type and size of an object within the captured image by analyzing information included in the captured image; and
    resizing the captured image into physically the same size as the real size of the object.

8. The method of claim 1, further comprising:
    displaying an indicator on the display unit indicating a measurement progress state while the reference object is moved away from the mobile terminal.

9. The method of claim 1, further comprising:
    communication, via a wireless communication unit of the mobile terminal, with a wearable device; and
    controlling the wearable device to output the measured spaced distance.

10. A mobile terminal, comprising:
    a wireless communication unit configured to provide wireless communication;
    a laser configured to emit a laser beam;
    a display unit configured to display a virtual measuring tape function on the mobile terminal for measuring a size of an object; and
    a controller configured to:
    set a reference object, the reference object including a palm,
    set a spaced distance of the reference object with respect to the mobile terminal to be zero when the reference object is brought into contact with the mobile terminal and one end of a subject,
    measure, via the laser, a horizontal length of the subject based on the spaced distance of the reference object with respect to the mobile terminal when the reference object is moved away from the mobile terminal and moved into another end of the subject,
    automatically measure a vertical length of the subject based on a state change of the terminal or the palm without additional manipulation when the measurement of the horizontal length of the subject is completed, and
    output at least one of the measured horizontal and vertical length of the subject,
    wherein the controller is further configured to:
    display, via a display unit of the mobile terminal, a webpage including an object and a size information of the object, the size information of the object including at least one of a horizontal length and a vertical length of the object,
    detect selection of the horizontal length or the vertical length of the object, and
    output an alarm or vibration when the measured spaced distance of the reference object reaches to the selected horizontal length or the vertical length of the object displayed on the webpage while the reference object is moved away from the mobile terminal, and
    wherein the virtual measuring tape function is automatically activated when the horizontal length or the vertical length of the object is selected.

11. The mobile terminal of claim 10, wherein the controller is further configured to display a virtual measuring tape menu on the display unit for setting the reference object,
    wherein the reference object includes an object previously captured and registered, and a wearable device.

12. The mobile terminal of claim 10, wherein the controller is further configured to output at least one of a warning sound and vibration when the reference object is moved outside a reference range and is not horizontally spaced from the mobile terminal.

13. The mobile terminal of claim 10, wherein the controller is further configured to display a measuring tape image and horizontal and vertical state checking indicators indicating horizontal and vertical positions of the reference object with respect to the mobile terminal on the display unit.

14. The mobile terminal of claim 10, wherein the controller is further configured to output a sound indicating the measuring tape is being unrolled as the reference object is moved away from the mobile terminal.

15. The mobile terminal of claim 10, wherein the controller is further configured to output notification information when the measured spaced distance of the reference object reaches a user-set reference distance.

16. The mobile terminal of claim 10, wherein the controller is further configured to display an indicator on the display unit indicating a measurement progress state while the reference object is moved away from the mobile terminal.

17. The mobile terminal of claim 10, wherein the controller is further configured to communicate with a wearable device via the wireless communication and control the wearable device to output the measured spaced distance.

18. The mobile terminal of claim 10, wherein the controller is further configured to:
display an icon for checking a real size of a captured image when the captured image is displayed on a screen,
recognize type and size of an object within the captured image by analyzing information included in the captured image, and
resizes the captured image into physically the same size as the real size of the object.

19. A method for measuring a length in a mobile terminal, the method comprising:
displaying, via a display unit of the mobile terminal, a webpage including an object and a size information of the object, the size information of the object including at least one of a horizontal length and a vertical length of the object;
automatically activating a virtual measuring tape function when the size information is selected;
setting, via a controller of the mobile terminal, a reference object;
measuring, via a laser of the mobile terminal, a spaced distance of the reference object with respect to the mobile terminal while the reference object is moved away from the mobile terminal; and
outputting an alarm or vibration when the measured spaced distance of the reference object matches with the horizontal length or the vertical length of the object displayed on the webpage.

* * * * *